United States Patent
Heaney et al.

(10) Patent No.: US 10,383,283 B2
(45) Date of Patent: Aug. 20, 2019

(54) BALE WRAPPER AND A COMBINED BALER/BALE WRAPPER

(71) Applicant: MCHALE ENGINEERING, Ballinrobe, County Mayo (IE)

(72) Inventors: James John Heaney, Claremorris (IE); Gerard Patrick Sheridan, Kilmaine (IE); Padraic Christopher McHale, Clonbur (IE); Martin William McHale, Kilmaine (IE); Paul Gerard McHale, Tuam (IE); John Patrick Biggins, Hollymount (IE); Donal Patrick Collins, Dunmore (IE); John Alexander Warren, Grange (IE)

(73) Assignee: McHale Engineering, Ballinrobe, County Mayo (IE)

( * ) Notice: Subject to any disclaimer, the term of this patent is extended or adjusted under 35 U.S.C. 154(b) by 940 days.

(21) Appl. No.: 14/422,953

(22) PCT Filed: Aug. 13, 2013

(86) PCT No.: PCT/IE2013/000017
§ 371 (c)(1),
(2) Date: Feb. 20, 2015

(87) PCT Pub. No.: WO2014/030150
PCT Pub. Date: Feb. 27, 2014

(65) Prior Publication Data
US 2015/0245563 A1   Sep. 3, 2015

(30) Foreign Application Priority Data

Aug. 21, 2012  (IE) .................................. S2012/0362
May 17, 2013  (IE) .................................. S2013/0166

(51) Int. Cl.
*A01F 15/07*   (2006.01)
*B65B 11/04*   (2006.01)
*B65B 35/30*   (2006.01)

(52) U.S. Cl.
CPC ............ *A01F 15/071* (2013.01); *B65B 11/04* (2013.01); *B65B 35/30* (2013.01);
(Continued)

(58) Field of Classification Search
CPC ............ A01F 15/071; A01F 2015/0735; A01F 2015/0755; A01F 2015/076;
(Continued)

(56) References Cited

U.S. PATENT DOCUMENTS 4,855,924 A * 8/1989 Strosser .............. A01F 15/0833
100/4
5,136,831 A * 8/1992 Fell ..................... A01F 15/0705
100/88
(Continued)

FOREIGN PATENT DOCUMENTS

CA    2081839 A1   5/1993
DE    299 11 916 U1   9/1999
(Continued)

OTHER PUBLICATIONS

International Search Report for PCT/IE2013/000017 dated Dec. 11, 2014 [PCT/ISA/210].
(Continued)

*Primary Examiner* — Andrew M Tecco
*Assistant Examiner* — Nicholas E Igbokwe
(74) *Attorney, Agent, or Firm* — Sughrue Mion, PLLC

(57) ABSTRACT

A combined baler/bale wrapper (1) comprises a baler (10) mounted on a chassis (5) and a bale wrapper (14) mounted on the chassis (5) rearwardly of the baler (10) for wrapping a bale formed by the baler (10). The bale wrapper (14)
(Continued)

Figure 1:
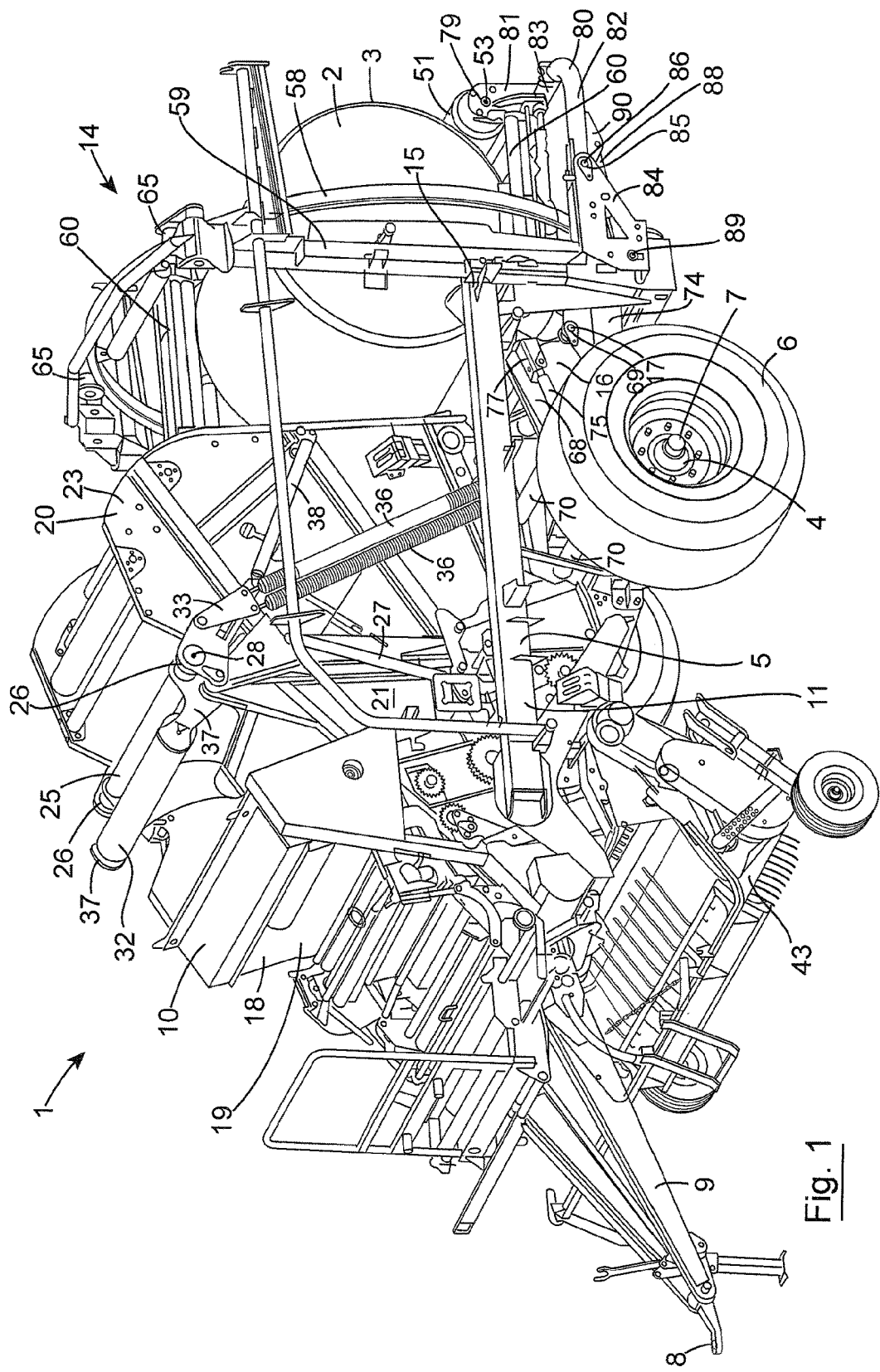

comprises a pair of first and second bale support rollers (50,51) for supporting and rotating the bale about a first wrapping axis (56). A pair of wrapping film dispensers (60) are carried on a carrier ring (58) which is rotated about a second wrapping axis (61) for dispensing wrapping film onto the bale (2) as the bale (2) is being rotated by the first and second bale support rollers (50,51). The first bale support roller (50) is carried on a transfer element (16) so that as the transfer element (16) is pivoted about a transfer pivot axis (17) from a first state to a second state for transferring the bale (2) onto the bale wrapper (14) the first bale support roller (50) is urged in a downwardly direction (F) in order to maximise the headroom available to the bale (2) as the bale (2) is being transferred by the transfer element (16) to the bale wrapper (14).

17 Claims, 16 Drawing Sheets

(52) U.S. Cl.
CPC . *A01F 2015/076* (2013.01); *A01F 2015/0735* (2013.01); *A01F 2015/0755* (2013.01)

(58) Field of Classification Search
CPC . A01F 2015/0725; B65B 11/04; B65B 11/58; B65B 2210/16; B65B 63/04
USPC ............ 53/116, 118, 588, 504, 587; 100/88; 56/341
See application file for complete search history.

(56) References Cited

U.S. PATENT DOCUMENTS

| | | | | |
|---|---|---|---|---|
| 5,551,218 | A * | 9/1996 | Henderson | A01F 15/07 100/13 |
| 5,631,826 | A * | 5/1997 | Chow | A01F 15/071 100/4 |
| 5,802,805 | A | 9/1998 | Oiestad | |
| 7,331,279 | B2 * | 2/2008 | Biziorek | A01F 15/07 100/48 |
| 2003/0024407 | A1 | 2/2003 | Ehrenpfort et al. | |
| 2007/0081878 | A1 * | 4/2007 | McHale | A01F 15/071 414/24.5 |
| 2007/0209530 | A1 * | 9/2007 | Viaud | A01F 15/08 100/88 |
| 2009/0202322 | A1 * | 8/2009 | Gette | A01F 15/071 414/24.5 |
| 2012/0137630 | A1 | 6/2012 | McHale et al. | |
| 2013/0036921 | A1 * | 2/2013 | Horstmann | A01F 15/0705 100/5 |

FOREIGN PATENT DOCUMENTS

| | | |
|---|---|---|
| EA | 006823 B1 | 4/2006 |
| JP | 64-026944 U | 2/1989 |
| JP | 06-070631 A | 3/1994 |
| JP | 2003-325034 A | 11/2003 |
| JP | 2011-177111 A | 9/2011 |
| RU | 2 146 437 C1 | 3/2000 |
| RU | 2 167 510 C2 | 5/2001 |
| WO | 97/05767 A1 | 2/1997 |
| WO | 02/076183 A1 | 10/2002 |
| WO | 2006/074667 A2 | 7/2006 |
| WO | 2006/093374 A1 | 9/2006 |
| WO | 2011/056063 A1 | 5/2011 |

OTHER PUBLICATIONS

Communication dated Jul. 31, 2017 by the Japanese Patent Office in counterpart Japanese Patent Application No. 2015-528003.
Communication dated Jul. 21, 2017 by the Russian Patent Office in counterpart Russian Patent Application No. 2015110065/13(015850).

* cited by examiner

BALE WRAPPER AND A COMBINED BALER/BALE WRAPPER

CROSS REFERENCE TO RELATED APPLICATIONS

This application is a National Stage of International Application No. PCT/IE2013/000017, filed on Aug. 13, 2013, which claims priority from Irish Patent Application Nos. S2012/0362, filed on Aug. 21, 2012, and S2013/0166, filed on May 17, 2013, the contents of all of which are incorporated herein by reference in their entirety.

The present invention relates to a bale wrapper, and the invention also relates to a combined baler/bale wrapper.

Combined baler/bale wrappers for forming and wrapping a bale of material are known. Such combined baler/bale wrappers are commonly used in the harvesting of forage material, such as, for example, grass, hay, straw and the like, and in particular, are used in the harvesting of grass to produce silage. Such baler/bale wrappers, in general, comprise a baler within which cylindrical bales are sequentially produced. Such bales are typically of length of approximately 1.25 meters and diameter in the range of 0.9 meter to 2.2 meters, and more typically of diameter in the range of 1.2 meters to 1.6 meters. The baler is mounted on a chassis. A bale wrapper for wrapping the formed bales sequentially with wrapping material, typically a wrapping film of plastics material, is mounted on the chassis to the rear of the baler for receiving the formed bales from the baler. Grass lying in swards in a field is picked up by a forwardly extending pick-up mechanism of the baler and delivered into a bale forming chamber of the baler where the cylindrical bale is formed. The formed cylindrical bale is then transferred from the baler onto the bale wrapper.

Typically the bale wrapper is a two-axis bale wrapper, and in general, the bale is supported on and rotated by a pair of parallel spaced apart bale support rollers about a first wrapping axis which coincides with the longitudinally extending main central geometrical axis of the bale. At least one and commonly two wrapping film dispensers are revolved around the bale about a second wrapping axis as the bale is being rotated about the first wrapping axis for dispensing wrapping film onto the bale for wrapping thereof. The second wrapping axis extends substantially perpendicularly relative to the first wrapping axis.

Such a combined baler/bale wrapper is disclosed in PCT published Application Specification No. WO 02/076183.

Balers for producing cylindrical bales of forage material of selectable diameter are known. Such balers are commonly referred to as belt balers and comprise a plurality of side by side belts supported on fixed position rotatably mounted rollers and rotatably mounted tensioning rollers configured to define a bale forming chamber which increases in diameter as the bale is being formed. The belts are driven by one or more of the fixed position rollers in order to rotate the bale as the bale is being formed in the bale forming chamber. The belts are tensioned by the tensioning rollers in order to compress the forage material tightly as the bale is being rotated and formed. By monitoring the position of one or more of the tensioning rollers or the tension in the belts, the diameter of the bale being formed at any given time can be determined.

Balers are being developed for producing bales of ever increasing diameter, and accordingly, bale wrappers for wrapping bales must be capable of wrapping such bales of increasing diameter.

Bale wrappers of the type disclosed in PCT published Application Specification No. WO 02/076183 comprise a pair of spaced apart bale support rollers which support and rotate the bale about a first wrapping axis, which coincides with the longitudinally extending central geometrical axis of the bale. One or a pair of wrapping film dispensers are carried on a carrier element which revolves the wrapping film dispensers around the rotating bale about a second wrapping axis for dispensing wrapping film onto the bale as the bale is rotated about the first wrapping axis. As discussed above, the second wrapping axis extends substantially perpendicularly relative to the first wrapping axis. In the bale wrapper disclosed in PCT published Specification No. WO 02/076183 the carrier element comprises a carrier ring which extends in a substantially vertical plane and defines the second wrapping axis which extends perpendicularly to the plane defined by the carrier ring and substantially horizontally. The carrier ring is rotated about the second wrapping axis for revolving the wrapping film dispensers about the second wrapping axis. The carrier ring is located relative to the bale support rollers on which the bale is rotated about the first wrapping axis with the plane defined by the carrier ring located intermediate the bale support rollers and with the first wrapping axis contained in a substantially vertical plane spaced apart from but relatively close to the plane defined by the carrier ring.

Since the wrapping film dispensers must pass both above and below the bale supported on the bale support rollers, the headroom available for the bale on the bale support rollers is limited and confined by both the carrier ring and by the wrapping film dispensers as the wrapping film dispensers pass above the bale between the bale and the carrier ring. Additionally, the headroom available to the bale is particularly limited by the carrier ring as the bale is being transferred onto the bale support rollers, particularly if the carrier ring is disposed closer to the forward bale support roller than the rearward bale support roller relative to normal forward direction of travel of the combined baler/bale wrapper.

It is desirable that even with the limited available headroom in such bale wrappers, such bale wrappers should be capable of wrapping bales of increasing diameter.

Additionally, in other such bale wrappers where one or more wrapping film dispensers are mounted on a carrier element and are revolved around the rotating bale such that the carrier element or the wrapping film dispensers as they are revolved around the rotating bale define a locus of travel which lies in a substantially horizontal plane, or a plane which lies no more than thirty degrees to the horizontal, a problem also arises where such bale wrappers are required to wrap bales of increasing diameter. It is desirable that the wrapping film as it is being dispensed from the wrapping film dispensers onto the bale should be substantially centrally aligned with the longitudinally extending central geometrical axis of the rotating bale. In other words, it is desirable that a longitudinally extending centre line of the wrapping film should coincide with the longitudinally extending central geometrical axis of the rotating bale as the wrapping film is being applied to the bale. In such bale wrappers, the bale wrappers are provided to wrap bales of a specific diameter. If a bale of greater or lesser diameter than the specific diameter for which the bale wrapper is designed is being wrapped on such a bale wrapper, the level of the central geometrical axis of the bale when supported on the bale support rollers will be at a level above or below the level at which the central geometrical axis of a bale of the specific diameter would be supported. Accordingly, the longitudinally extending centre line of the wrapping film will not coincide with the central geometrical axis of such bales of greater or lesser diameter than the specific diameter when the wrapping film is being applied to such bales. This is undesirable.

There is therefore a need for a bale wrapper which addresses at least some of the above discussed problems. There is also a need for a combined baler/bale wrapper for producing wrapped bales of varying diameter and also of selectable diameters which addresses at least some of the above problems.

The present invention is directed towards providing such a bale wrapper and the invention is also directed towards providing such combined baler/bale wrapper.

According to the invention there is provided a bale wrapper for wrapping a bale of material, the bale wrapper comprising a chassis, rotatably mounted substantially parallel spaced apart first and second bale support rollers operable in a bale wrapping state for supporting the bale and for rotating the bale about a first wrapping axis during wrapping of the bale, a transfer means for transferring a bale onto the bale wrapper, the transfer means being operable from a first state for receiving a bale thereon to a second state for transferring the bale onto the bale wrapper, the first bale support roller being located on the transfer means and being moveable relative to and independently of the second bale support roller in a generally downwardly direction from the bale wrapping state as the transfer means is operated from the first state to the second state for minimising the headroom required by the bale as the bale is being transferred by the transfer means to the bale wrapper.

Preferably, the first bale support roller is mounted on the transfer means.

Advantageously, the transfer means is pivotal about a transfer pivot axis between the first state and the second state.

In one aspect of the invention the transfer means comprises a receiving means for receiving a bale to be transferred to the bale wrapper. Preferably, the receiving means is located to one side of the transfer pivot axis, and the first bale support roller is located to the other side of the transfer pivot axis, so that as the transfer means is being pivoted from the first state to the second state, the receiving means is urged in a generally upwardly direction, and the first bale support roller is urged in the generally downward direction from the bale wrapping state. Advantageously, the receiving means comprises a pair of spaced apart carrier members carried on the transfer means.

Preferably, the carrier members extend parallel to each other and are spaced apart from and are parallel to the transfer pivot axis.

Preferably, the receiving means is configured relative to the first bale support roller so that as the transfer means is being operated from the first state to the second state, the bale is displaced onto the first bale support roller.

Advantageously, the first bale support roller is rotatably mounted on the transfer means about a first rotational axis parallel to and spaced apart from the transfer pivot axis.

Preferably, the second bale support roller is rotatable about a second rotational axis extending parallel to and spaced apart from the first rotational axis defined by the first bale support roller.

Preferably, the second rotational axis defined by the second bale support roller and the transfer pivot axis are located on respective opposite sides of the first rotational axis defined by the first bale support roller.

In another aspect of the invention the transfer means is pivotally mounted on the chassis about the transfer pivot axis, and the second bale support roller is rotatably mounted on the chassis.

Preferably, the transfer pivot axis is located at a level below a plane containing the first and second rotational axes defined by the first and second bale support rollers when the first bale support roller is in the bale wrapping state.

Advantageously, the first bale support roller is configured on the transfer means so that when the transfer means is in the second state, the first bale support roller is in a maximum downwardly displaced state at its maximum spacing below a horizontal plane containing the second rotational axis defined by the second bale support roller.

In one aspect of the invention a first urging means is provided for urging the transfer means between the first and second states.

In another aspect of the invention a first drive means is provided for driving at least one of the first and second bale support rollers for in turn rotating the bale supported on the first and second bale support rollers about the first wrapping axis.

In another aspect of the invention a carrier means is provided for carrying and guiding at least one wrapping material dispenser along a locus of travel about a second wrapping axis for dispensing wrapping material onto the bale as the bale is being rotated on the first and second bale support rollers about the first wrapping axis, the second wrapping axis extending relative to the first wrapping axis at an angle greater than zero.

Preferably, the second wrapping axis extends substantially perpendicularly relative to the first wrapping axis.

Advantageously, the carrier means defines a carrier plane containing the locus of travel through which the at least one wrapping material dispenser is guided by the carrier means about the second wrapping axis. Preferably, the second wrapping axis extends substantially perpendicularly to the carrier plane.

In one aspect of the invention the carrier plane extends in one of a generally upwardly direction extending parallel with or coinciding with a vertical plane containing the first wrapping axis, a generally upwardly inclined direction inclining upwardly relative to the vertical plane containing the first wrapping axis in a general direction towards the first bale support roller, and a generally upwardly inclined direction relative to the vertical plane containing the first wrapping axis in a general direction towards the second bale support roller.

Preferably the carrier plane extends in the generally upwardly inclined direction towards the one of the first bale support roller and the second bale support roller at an angle not greater than 30° to the vertical plane containing the first wrapping axis. Advantageously, the carrier plane extends in the generally upwardly inclined direction towards the one of the first bale support roller and the second bale support roller at an angle not greater than 20° to the vertical plane containing the first wrapping axis. Ideally, the carrier plane extends in the generally upwardly inclined direction towards the one of the first bale support roller and the second bale support roller at an angle not greater than 5° to the vertical plane containing the first wrapping axis.

In an alternative aspect of the invention the carrier plane extends substantially vertically.

In one aspect of the invention the first rotational axis defined by the first bale support roller extends substantially perpendicularly to a vertical plane containing the second wrapping axis.

In another aspect of the invention the carrier means comprises a carrier element. Preferably, the carrier element is rotatably mounted on the chassis about the second wrapping axis for revolving the at least one wrapping material dispenser about the second wrapping axis. Advantageously, the carrier means comprises a carrier ring.

In another aspect of the invention the carrier plane is located between the first bale support roller and the second bale support roller. Preferably, the carrier plane lies closer to the first bale support roller than to the second bale support roller.

In another aspect of the invention the first and second bale support rollers are spaced apart from each other a distance sufficient for accommodating the wrapping material from the at least one wrapping material dispenser onto the bale as the at least one wrapping material dispenser is being guided along the locus of travel about the second wrapping axis.

In a further aspect of the invention a second drive means is provided for urging the at least one wrapping material dispenser along the locus of travel about the second wrapping axis.

In another aspect of the invention one of the first bale support roller and the second bale support roller is moveable relative to the other one of the first bale support roller and the second bale support roller into selectable ones of a plurality of bale wrapping states co-operating with the other one of the first and second bale support rollers for supporting bales thereon of different diameters for minimising the headroom required by a bale supported on the first and second bale support rollers. Preferably, the moveable one of the first and second bale support rollers is moveable into the selectable ones of the bale wrapping states by moving the moveable one of the first and second bale support rollers relative to the other one of the first and second bale support rollers for altering the spacing between the first and second bale support rollers. Alternatively, the moveable one of the first and second bale support rollers is moveable into the selectable ones of the bale wrapping states by altering the level of the moveable one of the first and second bale support rollers relative to the level of the other one of the first and second bale support rollers.

In another aspect of the invention a second urging means is provided for urging the moveable one of the first and second bale support rollers between the selectable ones of the plurality of bale wrapping states.

Preferably, the second bale support roller is moveable relative to the first bale support roller into the selectable ones of the bale wrapping states.

In one aspect of the invention the bale wrapper is configured for wrapping a cylindrical bale with the longitudinally extending central geometrical axis of the bale substantially coinciding with the first wrapping axis.

Additionally the invention provides a bale wrapper for wrapping a cylindrical bale of material, the bale wrapper comprising a chassis, rotatably mounted substantially parallel spaced apart first and second bale support rollers operable in a bale wrapping state for supporting the bale and for rotating the bale about a first wrapping axis substantially coinciding with a longitudinally extending central geometrical axis of the bale during wrapping of the bale, a carrier means for carrying and guiding at least one wrapping material dispenser along a locus of travel about a second wrapping axis extending substantially perpendicularly relative to the first wrapping axis for dispensing wrapping material onto the bale as the bale is being rotated on the first and second bale support rollers about the first wrapping axis, the carrier means defining a carrier plane containing the locus of travel through which the at least one wrapping material dispenser is guided by the carrier means, the carrier plane extending in one of a generally upwardly direction extending parallel with or coinciding with a vertical plane containing the first wrapping axis, a generally upwardly inclined direction inclining upwardly relative to the vertical plane containing the first wrapping axis in a general direction towards the first bale support roller, and a generally upwardly inclined direction relative to the vertical plane containing the first wrapping axis in a general direction towards the second bale support roller, a transfer means for transferring a bale onto the bale wrapper, the transfer means being operable from a first state for receiving a bale thereon to a second state for transferring the bale onto the bale wrapper, the first bale support roller being located on the transfer means and being moveable relative to and independently of the second bale support roller in a generally downwardly direction from the bale wrapping state as the transfer means is operated from the first state to the second state for minimising the headroom required by the bale as the bale is being transferred by the transfer means to the bale wrapper.

The invention also provides a bale wrapper for wrapping a bale of material, the bale wrapper comprising a chassis, rotatably mounted substantially parallel spaced apart first and second bale support rollers operable in a bale wrapping state for supporting the bale during wrapping thereof and for rotating the bale about a first wrapping axis, a carrier means for carrying and guiding at least one wrapping material dispenser along a locus of travel about a second wrapping axis extending at an angle greater than zero to the first wrapping axis for dispensing wrapping material onto the bale as the bale is being rotated about the first wrapping axis by the first and second bale support rollers, wherein one of the first and second bale support rollers is moveable relative to and independently of the other one of the first and second bale support rollers into selectable ones of a plurality of bale wrapping states co-operable with the other one of the first and second bale support rollers for supporting and rotating bales of different diameter in order to minimise the headroom required by the bale.

In one aspect of the invention a means is provided for setting the moveable one of the first and second bale support rollers in respective ones of the selectable bale wrapping states in response to a select signal. Preferably, the select signal is indicative of the diameter of the bale to be wrapped.

In one aspect of the invention the first and second bale support rollers are rotatable about first and second rotational axes, respectively.

In another aspect of the invention the moveable one of the first and second bale support rollers is moveable relative to the other one of the first and second bale support rollers into the selectable ones of the bale wrapping states for maintaining the longitudinally extending central geometrical axis of the bale within predefined upper and lower levels.

In another aspect of the invention the moveable one of the first and second bale support rollers is moveable into the selectable ones of the bale wrapping states by moving the moveable one of the first and second bale support rollers relative to the other one of the first and second bale support rollers for altering the spacing between the first and second bale support rollers. Alternatively, the moveable one of the first and second bale support rollers is moveable into the selectable ones of the bale wrapping states by altering the level of the moveable one of the first and second bale support rollers relative to the level of the other one of the first and second bale support rollers.

In another aspect of the invention the moveable one of the first and second bale support rollers is moveable through the selectable ones of the bale wrapping states between a lower level with the rotational axis of the moveable one of the first and second bale support rollers at a level not more than 300 mm below a horizontal plane containing the rotational axis of the other one of the first and second bale support rollers, and an upper level with the rotational axis of the moveable one of the first and second bale support rollers at a level not more than 300 mm above the horizontal plane containing the rotational axis of the other one of the first and second bale support rollers.

Preferably, in the lower level of the moveable one of the first and second bale support rollers, the rotational axis of the moveable one of the first and second bale support rollers is not more than 200 mm below the horizontal plane containing the rotational axis of the other one of the first and second bale support rollers, and in the upper level of the moveable one of the first and second bale support rollers, the rotational axis of the moveable one of the first and second bale support rollers is not more than 200 mm above the horizontal plane containing the rotational axis of the other one of the first and second bale support rollers.

Advantageously, in the lower level of the moveable one of the first and second bale support rollers, the rotational axis of the moveable one of the first and second bale support rollers is not more than 100 mm below the horizontal plane containing the rotational axis of the other one of the first and second bale support rollers, and in the upper level of the moveable one of the first and second bale support rollers, the rotational axis of the moveable one of the first and second bale support rollers is not more than 100 mm above the horizontal plane containing the rotational axis of the other one of the first and second bale support rollers.

In another aspect of the invention the moveable one of the first and second bale support rollers is carried on a mounting element, the mounting element being moveable relative to the chassis for moving the moveable one of the first and second bale support rollers into the selectable ones of the bale wrapping states. Preferably, the mounting element is pivotal about a pivot mounting axis relative to the chassis. Advantageously, the pivot mounting axis extends parallel to the first and second bale support rollers. Preferably, the pivot mounting axis is located intermediate the first and second bale support rollers.

In one aspect of the invention the pivot mounting axis is located at a level below the first and second rotational axes defined by the first and second bale support rollers when the first and second bale support rollers are in the selectable ones of the bale wrapping states.

In one aspect of the invention an urging means is provided for urging the moveable one of the first and second bale support rollers into the selectable ones of the bale wrapping states. Preferably, the urging means is responsive to the select signal for urging the moveable one of the first and second bale support rollers into the selectable ones of the bale wrapping states.

In another aspect of the invention the moveable one of the first and second bale support rollers is moveable downwardly from the selectable ones of the bale wrapping states for discharging a wrapped bale from the bale wrapper. Preferably, the moveable one of the first and second bale support rollers comprises the second bale support roller.

In one aspect of the invention the bale wrapper is configured for wrapping a cylindrical bale with the longitudinally extending central geometrical axis of the bale substantially coinciding with the first wrapping axis.

The invention also provides a combined baler/bale wrapper comprising a baler mounted on a chassis, and any one of the bale wrappers according to the invention mounted on the chassis and disposed relative to the baler for receiving a bale discharged from the baler.

The invention further provides a combined baler/bale wrapper comprising a baler mounted on a chassis, and a bale wrapper mounted on the chassis for wrapping the bale, the bale wrapper comprising rotatably mounted substantially parallel spaced apart first and second bale support rollers operable in a bale wrapping state for supporting the bale and for rotating the bale about a first wrapping axis during wrapping of the bale, a transfer means for transferring the bale onto the bale wrapper, the transfer means being operable from a first state for receiving the bale thereon from the baler to a second state for transferring the bale onto the bale wrapper, the first bale support roller being located on the transfer means and being moveable relative to and independently of the second bale support roller in a generally downwardly direction from the bale wrapping state as the transfer means is operated from the first state to the second state for minimising the headroom required by the bale as the bale is being transferred by the transfer means to the bale wrapper.

Additionally, the invention provides a combined baler/bale wrapper comprising a baler mounted on a chassis, and a bale wrapper mounted on the chassis for wrapping the bale, the bale wrapper comprising rotatably mounted substantially parallel spaced apart first and second bale support rollers operable in a bale wrapping state for supporting the bale and for rotating the bale about a first wrapping axis substantially coinciding with a longitudinally extending central geometrical axis of the bale during wrapping of the bale, a carrier means for carrying and guiding at least one wrapping material dispenser along a locus of travel about a second wrapping axis extending substantially perpendicularly relative to the first wrapping axis for dispensing wrapping material onto the bale as the bale is being rotated on the first and second bale support rollers about the first wrapping axis, the carrier means defining a carrier plane containing the locus of travel through which the at least one wrapping material dispenser is guided by the carrier means, the carrier plane extending in one of a generally upwardly direction extending parallel with or coinciding with a vertical plane containing the first wrapping axis, a generally upwardly inclined direction inclining upwardly relative to the vertical plane containing the first wrapping axis in a general direction towards the first bale support roller, and a generally upwardly inclined direction inclining upwardly relative to the vertical plane containing the first wrapping axis in a general direction towards the second bale support roller, a transfer means for transferring a bale onto the bale wrapper, the transfer means being operable from a first state for receiving a bale thereon to a second state for transferring the bale onto the bale wrapper, the first bale support roller being located on the transfer means and being moveable relative to and independently of the second bale support roller in a generally downwardly direction from the bale wrapping state as the transfer means is operated from the first state to the second state for minimising the headroom required by the bale as the bale is being transferred by the transfer means to the bale wrapper.

In one aspect of the invention the transfer means is pivotal about a transfer pivot axis between the first state and the second state, and the transfer means comprises a receiving means for receiving the bale, the receiving means being located to one side of the transfer pivot axis, the first bale support roller being located to the other side of the transfer pivot axis, so that as the transfer means is being pivoted from the first state to the second state, the receiving means is urged in a generally upwardly direction, and the first bale support roller is urged in the generally downward direction from the bale wrapping state.

Preferably, the baler is adapted to produce a cylindrical bale defining a longitudinally extending central geometrical axis, and the baler is located on the chassis to discharge the bale with the longitudinally extending central geometrical axis of the bale extending substantially parallel to the first and second bale support rollers of the bale wrapper.

Advantageously, the baler is located on the chassis to form the bale with the longitudinally extending central axis defined by the bale in the baler as the bale is being formed extending substantially parallel to the first and second bale support rollers of the bale wrapper.

Preferably, the bale wrapper is located rearwardly of the baler relative to the normal forward direction of travel of the combined baler/bale wrapper.

Advantageously, the bale wrapper is located relative to the baler so that a formed bale is discharged from the baler onto the transfer means when the transfer means is in the first state.

In one aspect of the invention the baler comprises a door which is operable between a closed state and an open state for accommodating discharge of a bale from the baler. Preferably, the door is pivotal about a door pivot axis. Advantageously, the door pivot axis is disposed adjacent an upper portion of the baler.

In another aspect of the invention the baler comprises a stationary part mounted on the chassis, and the door is pivotally coupled to the stationary part about the door pivot axis, the stationary part defining an open mouth through which a formed bale is discharged from the baler, and the door when in the closed state closes the open mouth. Preferably, the door is located to the rear of the stationary part of the baler relative to the normal forward direction of travel of the combined baler/bale wrapper.

In another aspect of the invention the open mouth of the baler faces in a generally rearward direction relative to the normal forward direction of travel of the combined baler/bale wrapper.

Preferably, the open mouth of the baler defines a plane which extends transversely relative to the normal forward direction of travel of the combined baler/bale wrapper, and in one of a generally upwardly direction, a generally upwardly inclined direction inclining upwardly relative to a transversely extending vertical plane in a generally forward direction relative to the normal forward direction of travel of the combined baler/bale wrapper, and a generally upwardly inclined direction inclining upwardly relative to the transversely extending vertical plane in a generally rearward direction relative to the normal direction of forward travel of the combined baler/bale wrapper.

Preferably, the plane defined by the open mouth extends in the generally upwardly inclined direction towards the one of the forward and rearward directions at an angle not greater than 30° to the transversely extending vertical plane. Advantageously, the plane defined by the open mouth extends in the generally upwardly inclined direction towards the one of the forward and rearward directions at an angle not greater than 20° to the transversely extending vertical plane. Ideally, the plane defined by the open mouth extends in the generally upwardly inclined direction towards the one of the forward and rearward directions at an angle not greater than 5° to the transversely extending vertical plane.

In another aspect of the invention the plane defined by the open mouth of the baler extends substantially vertically.

In a further aspect of the invention the baler is mounted on the chassis so that when the door of the baler is urged from the closed state to the open state, a formed bale is discharged from the baler onto the transfer means of the bale wrapper.

In a further aspect of the invention a control means is provided for controlling the operation of the baler and the bale wrapper, and an input means is provided communicating with the control means for facilitating inputting to the control means of an input signal indicative of a selected diameter to which the bale is to be formed by the baler. Preferably, the control means is responsive to the input signal indicative of the selected diameter to which the bale is to be formed for controlling the second urging means of the bale wrapper to urge the moveable one of the first and second bale support rollers relative to the other one of the first and second bale support rollers to the one of the selectable bale wrapping states corresponding to the selected diameter to which the bale is to be formed. Advantageously, the control means is responsive to the input signal indicative of the selected diameter to which the bale is to be formed for controlling the baler to produce the bale of the selected diameter.

In another aspect of the invention a first monitoring means is provided for monitoring a characteristic of the baler indicative of the diameter of the bale being formed in the baler, and the control means is responsive to a signal from the first monitoring means indicative of the bale being of the selected diameter for operating the baler to discharge the bale onto the transfer means, and for operating the transfer means to transfer the bale to the bale wrapper.

In a further aspect of the invention a second monitoring means is provided for monitoring the bale wrapping state of the moveable one of the first and second bale support rollers relative to the other one of the first and second bale support rollers, and the control means is responsive to signals from the second monitoring means for determining when the moveable one of the first and second bale support rollers is in the selectable one of the bale wrapping states corresponding to the selected diameter of the bale.

In one aspect of the invention the baler comprises a belt baler.

Additionally the invention provides a combined baler/bale wrapper comprising a baler mounted on a chassis and a bale wrapper mounted on the chassis, the bale wrapper comprising rotatably mounted substantially parallel spaced apart first and second bale support rollers operable in a bale wrapping state for supporting the bale during wrapping thereof and for rotating the bale about a first wrapping axis, a carrier means for carrying and guiding at least one wrapping material dispenser along a locus of travel about a second wrapping axis extending at an angle greater than zero to the first wrapping axis for dispensing wrapping material onto the bale as the bale is being rotated about the first wrapping axis by the first and second bale support rollers, wherein one of the first and second bale support rollers is moveable relative to and independently of the other one of the first and second bale support rollers into selectable ones of a plurality of bale wrapping states co-operable with the other one of the first and second bale support rollers for supporting and rotating bales of different diameter in order to minimise the headroom required by the bale, the bale wrapper being disposed relative to the baler for receiving bales discharged from the baler.

In one aspect of the invention a control means is provided for controlling the operation of the baler and the bale wrapper, and an input means is provided communicating with the control means for facilitating inputting to the control means of an input signal indicative of a selected diameter to which the bale is to be formed by the baler.

Preferably, the control means is responsive to the input signal indicative of the selected diameter to which the bale is to be formed for controlling the urging means of the bale wrapper to urge the moveable one of the first and second bale support rollers relative to the other one of the first and second bale support rollers to the one of the selectable bale wrapping states corresponding to the selected diameter to which the bale is to be formed.

Advantageously, the control means is responsive to the input signal indicative of the selected diameter to which the bale is to be formed for controlling the baler to produce the bale of the selected diameter.

In one aspect of the invention a first monitoring means is provided for monitoring a characteristic of the baler indicative of the diameter of the bale being formed in the baler, and the control means is responsive to a signal from the first monitoring means indicative of the bale being of the selected diameter for operating the baler to discharge the bale onto a transfer means, and for operating the transfer means to transfer the bale to the bale wrapper.

In another aspect of the invention a second monitoring means is provided for monitoring the state of the moveable one of the first and second bale support rollers relative to the other one of the first and second bale support rollers, and the control means is responsive to signals from the second monitoring means for determining when the moveable one of the first and second bale support rollers is in the selectable one of the bale wrapping states corresponding to the selected diameter of the bale.

In a further aspect of the invention the baler comprises a belt baler.

The advantages of the invention are many. In particular, the bale wrapper and the combined baler/bale wrapper according to the invention permit the wrapping of bales of diameter greater than those which could otherwise be wrapped on known bale wrappers and on the bale wrappers of combined baler/bale wrappers. By virtue of the fact that the first bale support roller is located on the transfer means so that as the transfer means is transferring a bale onto the bale wrapper, the first bale support roller is moved in a generally downwardly direction, the headroom available to the bale as the bale is being transferred over the first bale support roller onto the bale wrapper is maximised. By providing one of the first and second bale support rollers to be moveable relative to the other one of the first and second bale support rollers into selectable ones of a plurality of bale wrapping states, the bale wrapping state of the moveable one of the first and second bale support rollers can be selected in order to suit the diameter of the bale to be wrapped in order to provide the appropriate headroom for the bale as the bale is being wrapped on the bale wrapper. When the bale wrapper is provided as part of a combined baler/bale wrapper and the bale wrapper is provided with both the transfer means and one of the first and second bale support rollers being moveable relative to the other one of the first and second bale support rollers into a plurality of selectable bale wrapping states, a particularly important advantage of the invention is achieved in that the headroom available for transferring the bale by the transfer means onto the bale wrapper is maximised, and the headroom available during wrapping of the bale on the bale wrapper can also be maximised.

Furthermore, by virtue of the fact that the moveable one of the first and second bale support rollers is moveable relative to the other one of the first and second bale support rollers into a plurality of selectable bale wrapping states, bales of different diameters can be supported on the bale support rollers with the level of the central geometrical axis of the supported bale being substantially constant or within relatively narrow upper and lower limits, so that in bale wrappers in which the locus through which the wrapping film dispenser or wrapping film dispensers are being revolved around the second wrapping axis defines a substantially horizontal plane, or a plane inclined at an angle of up to 30° to the horizontal, the wrapping film will be applied to the bale with the longitudinally extending centre line of the wrapping film substantially coinciding with the central geometrical axis of the bale.

A particularly important advantage of the invention is achieved when the combined baler/bale wrapper is provided with the bale wrapper according to the invention which comprises the transfer element with the first bale support roller mounted on the transfer element, in that the baler can be mounted on the chassis at a lower level relative to the bale wrapper than balers can be mounted relative to bale wrappers of combined baler/bale wrappers known heretofore. This is due to the fact that the transfer element is locatable at a lower level relative to the bale wrapper than the transfer elements of bale wrappers known heretofore, and therefore, the baler can be mounted on the chassis at a lower level relative to the bale wrapper, and the bale can still be discharged by the baler under gravity onto the transfer element of the bale wrapper when the transfer element is in the first state. It is the fact that the first bale support roller is mounted on the transfer element, and the fact that as the transfer element is pivoting upwardly from the first state to the second state to transfer the bale onto the bale wrapper, the first bale support roller is urged downwardly from the bale wrapping state which permits the transfer element in the first state to be located at a considerably lower level relative to the bale wrapper than transfer elements can be located relative to bale wrappers known heretofore. Additionally, the fact that the transfer element in the first state is located at a lower level than transfer elements of bale wrappers known heretofore provides a further advantage in that the spacing required between the baler and the bale wrapper to accommodate pivoting of the transfer element from the first state to the second state can be significantly reduced.

Figure 2:
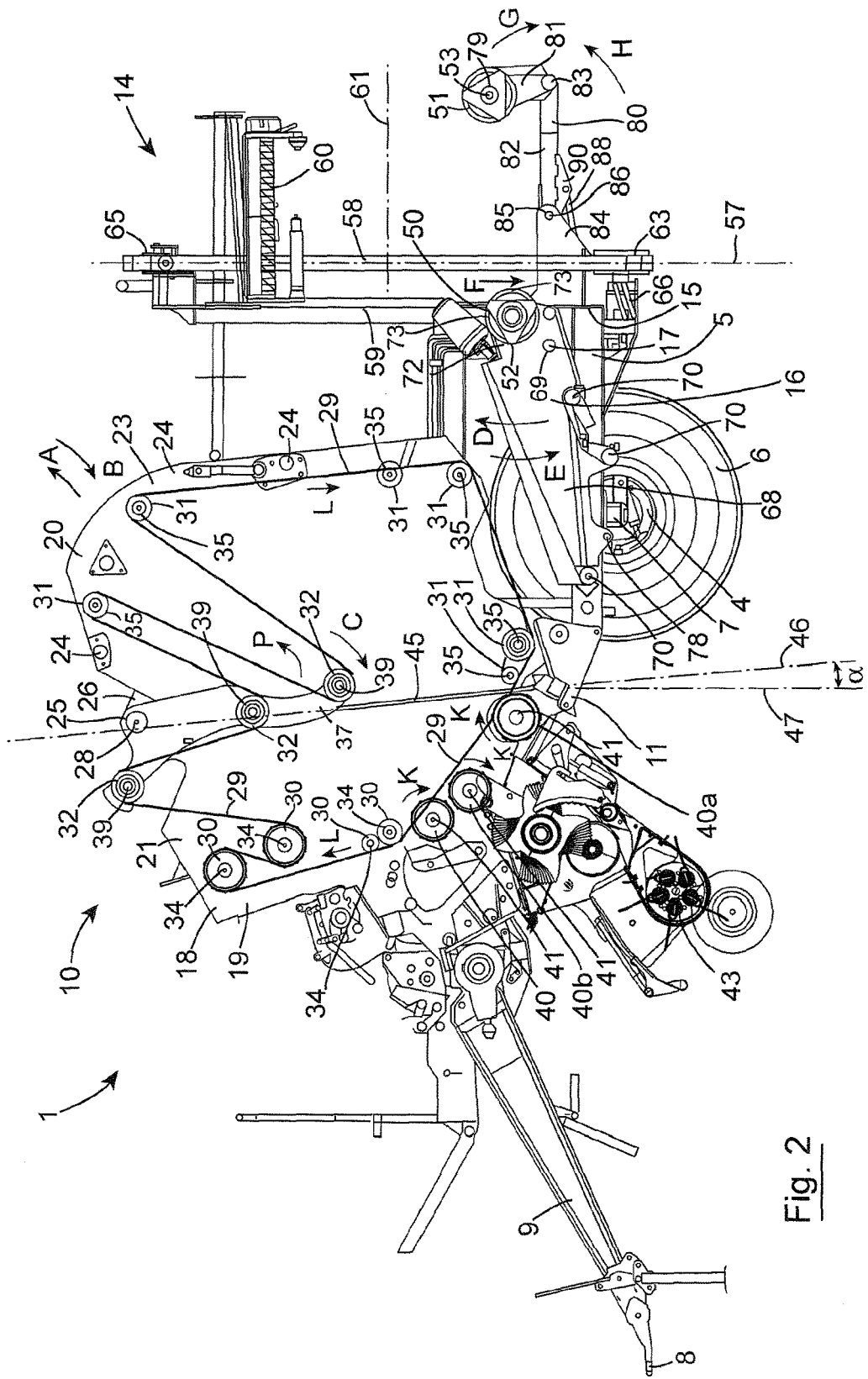
Figure 3:
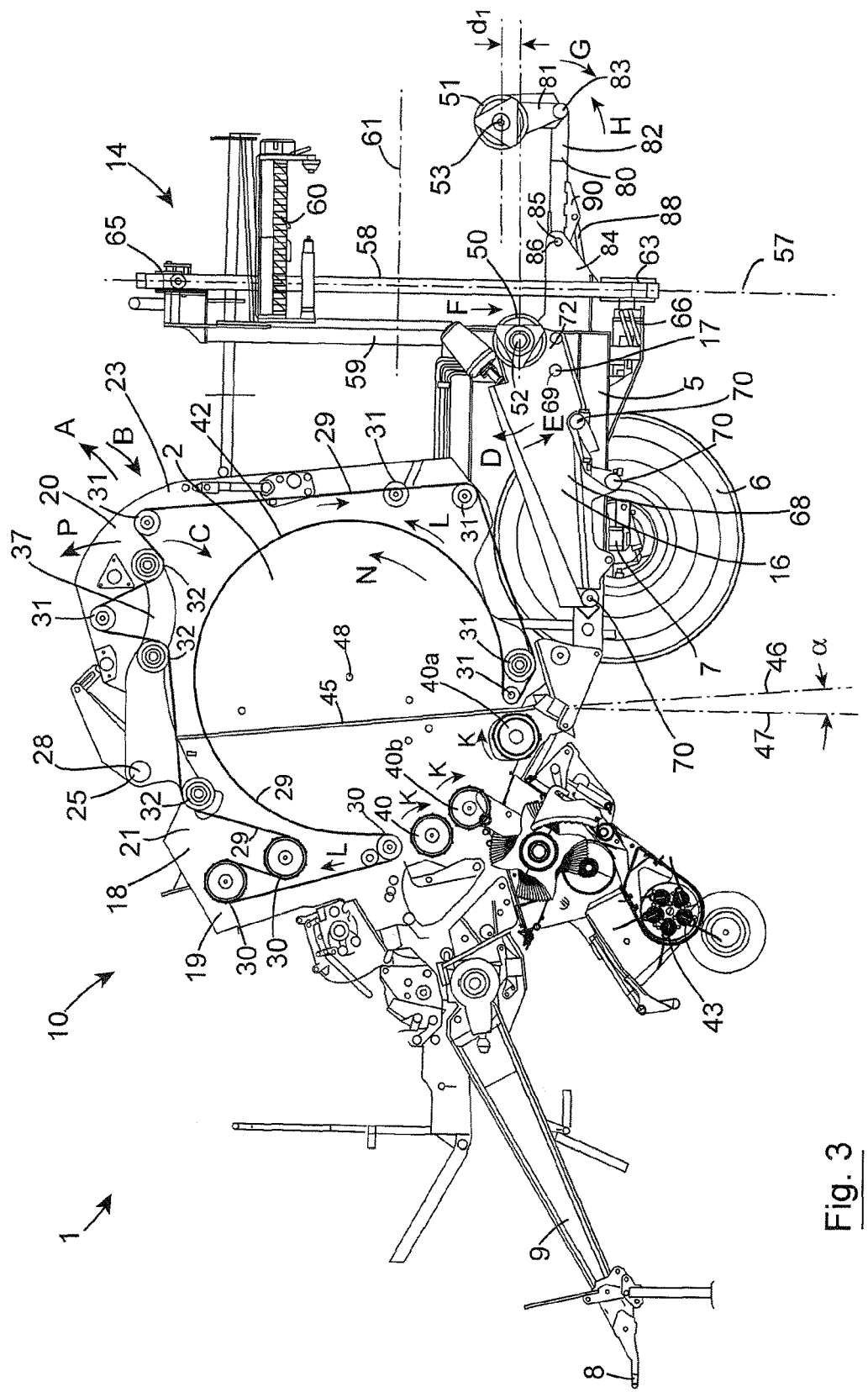
Figure 4:
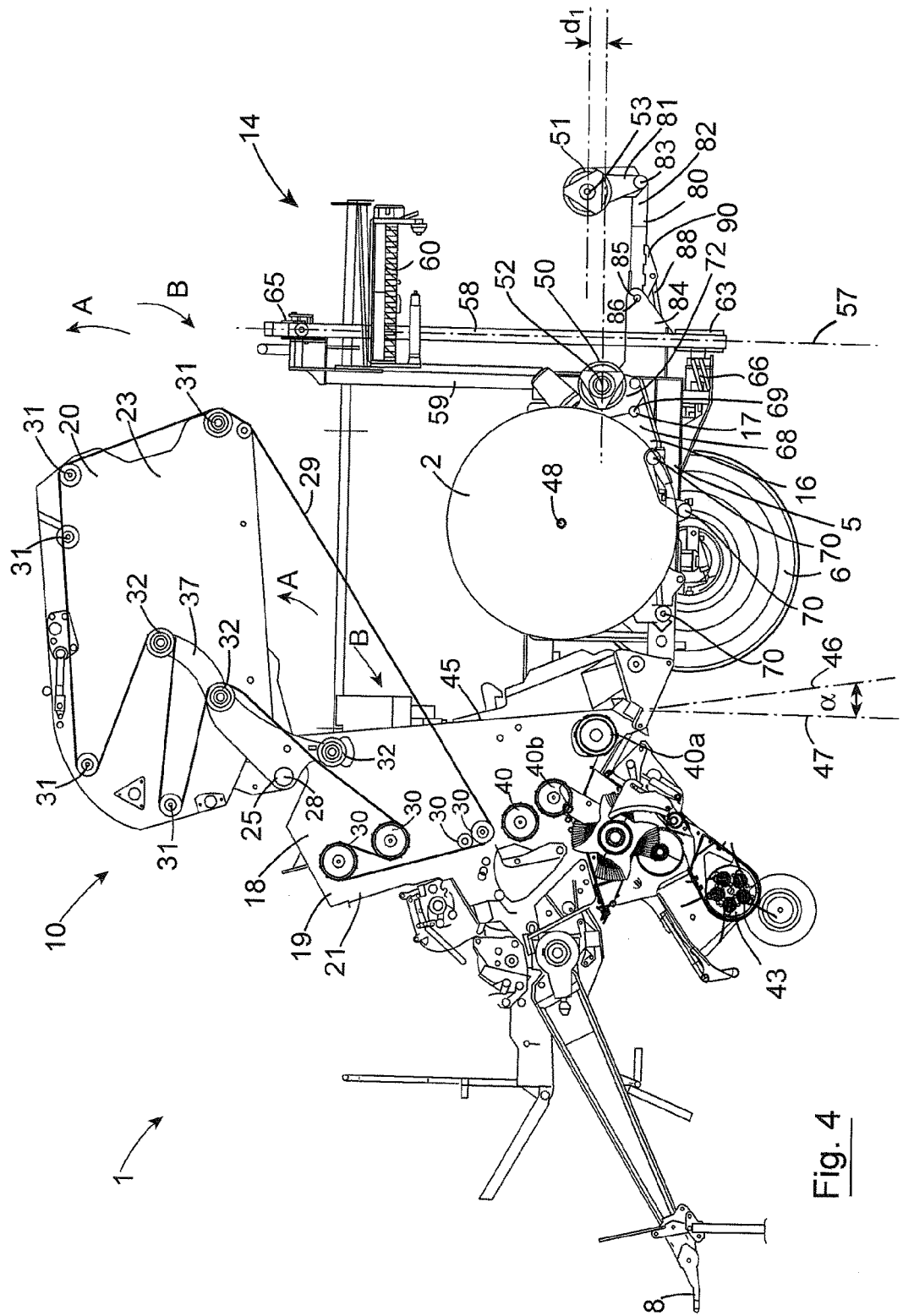
Figure 5:
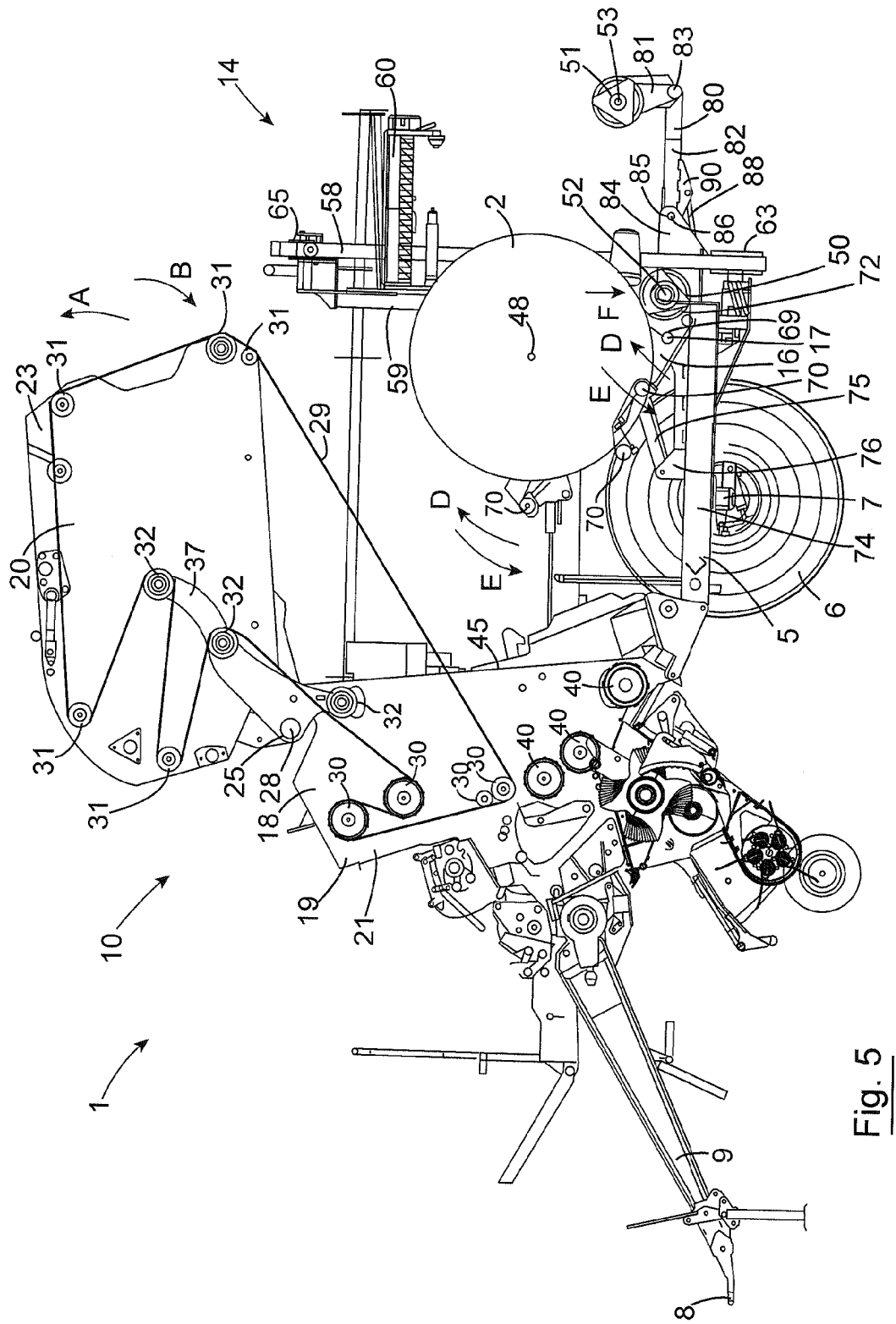
Figure 6:
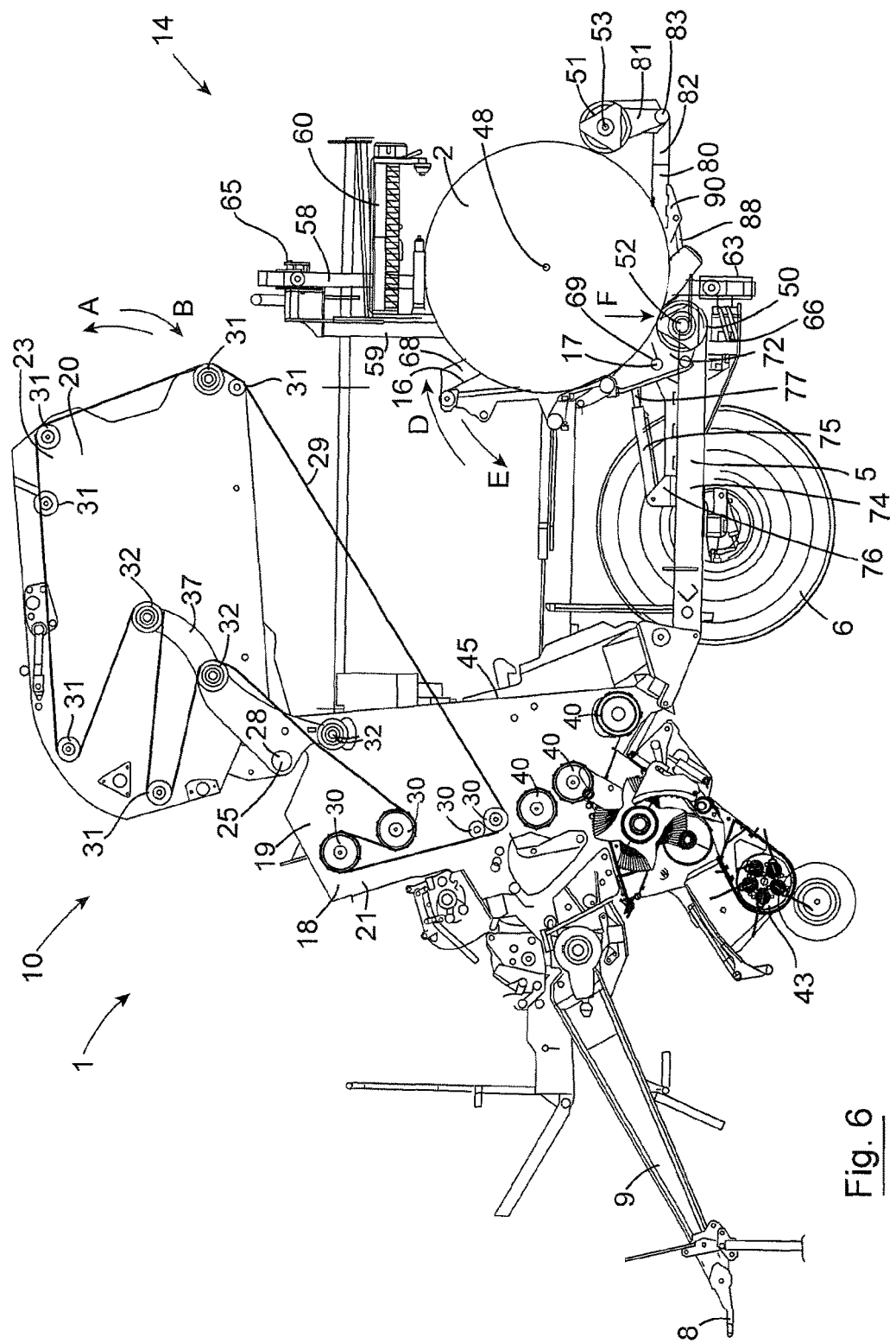
Figure 7:
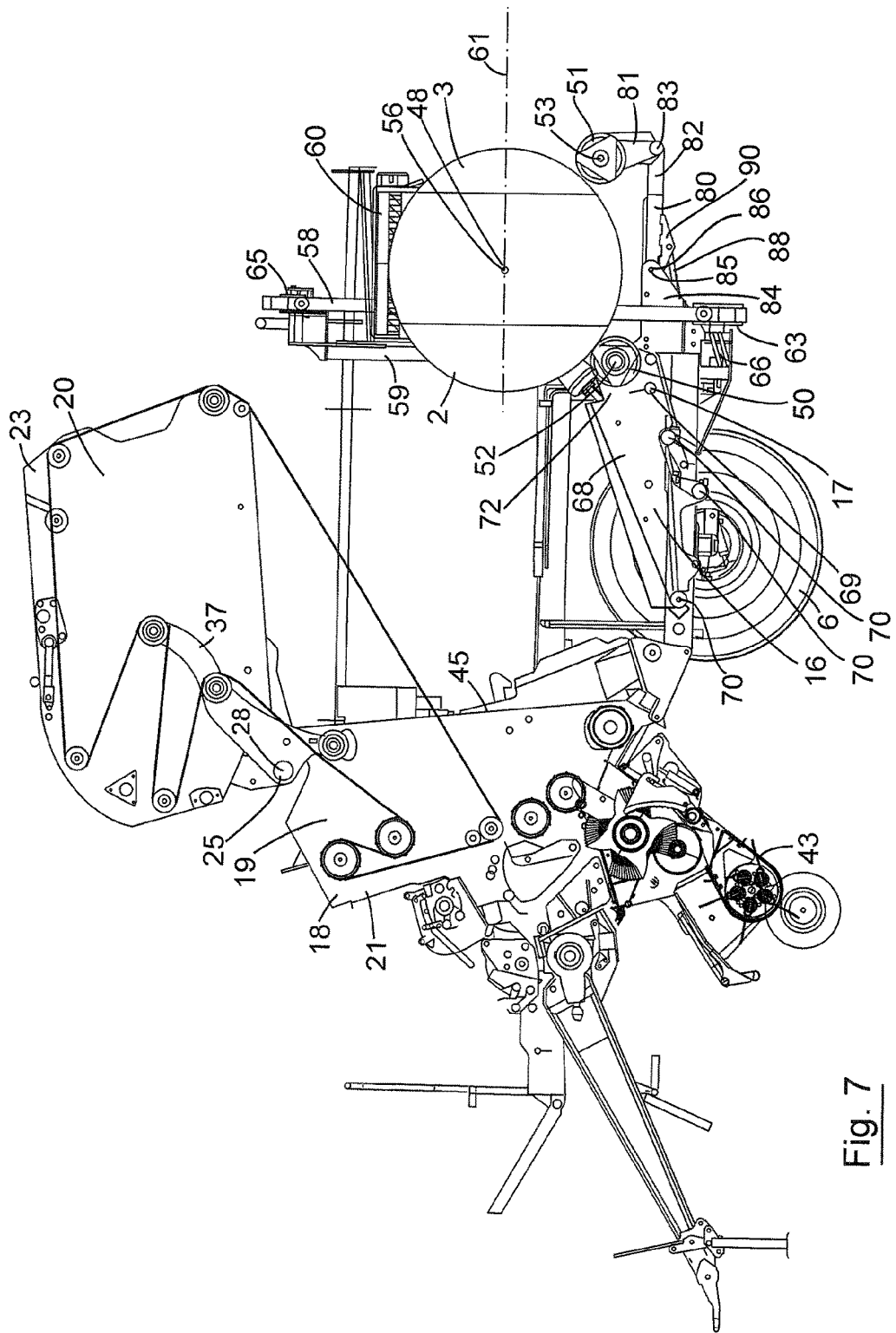
Figure 8:
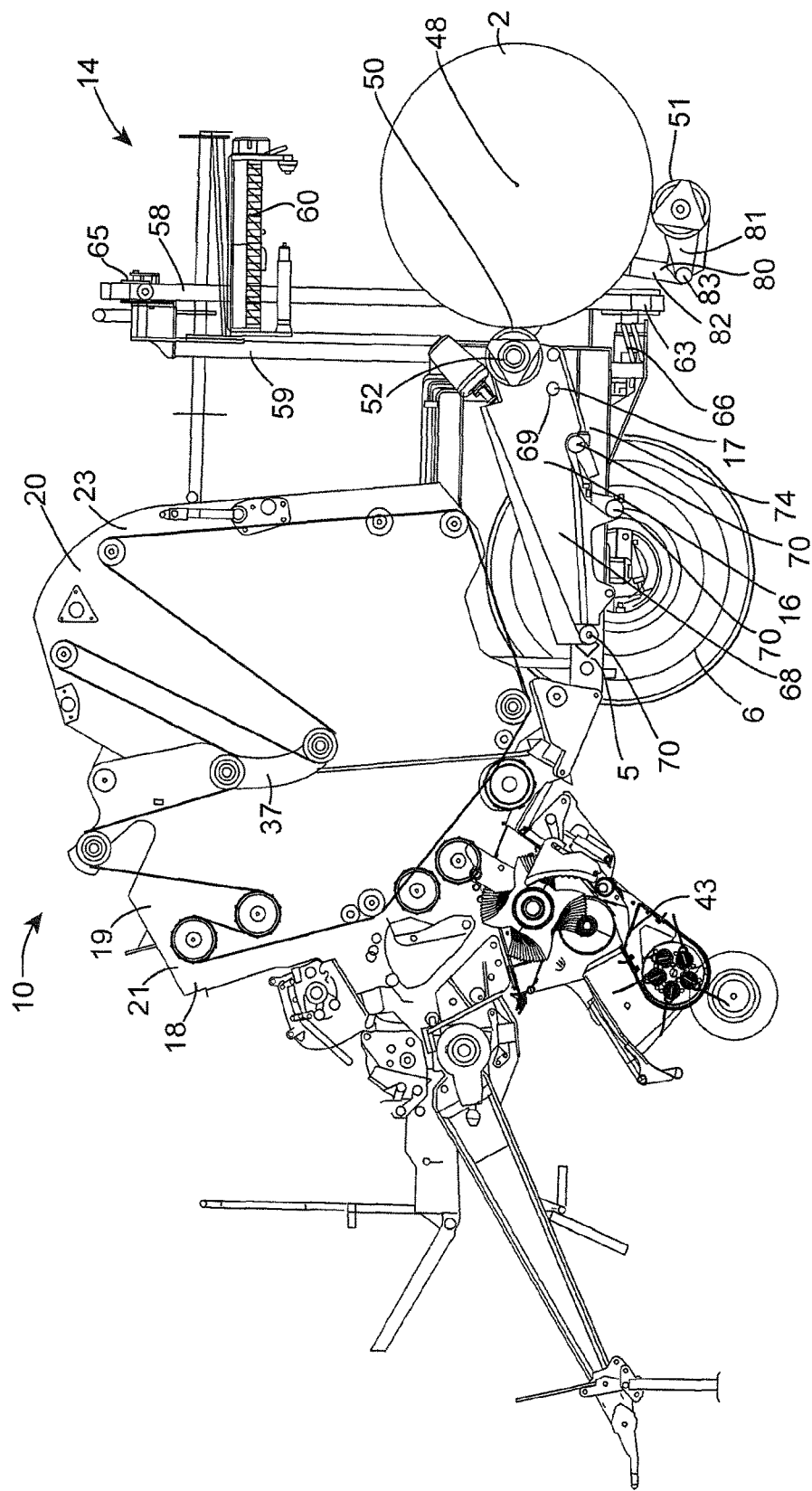
Figure 9:
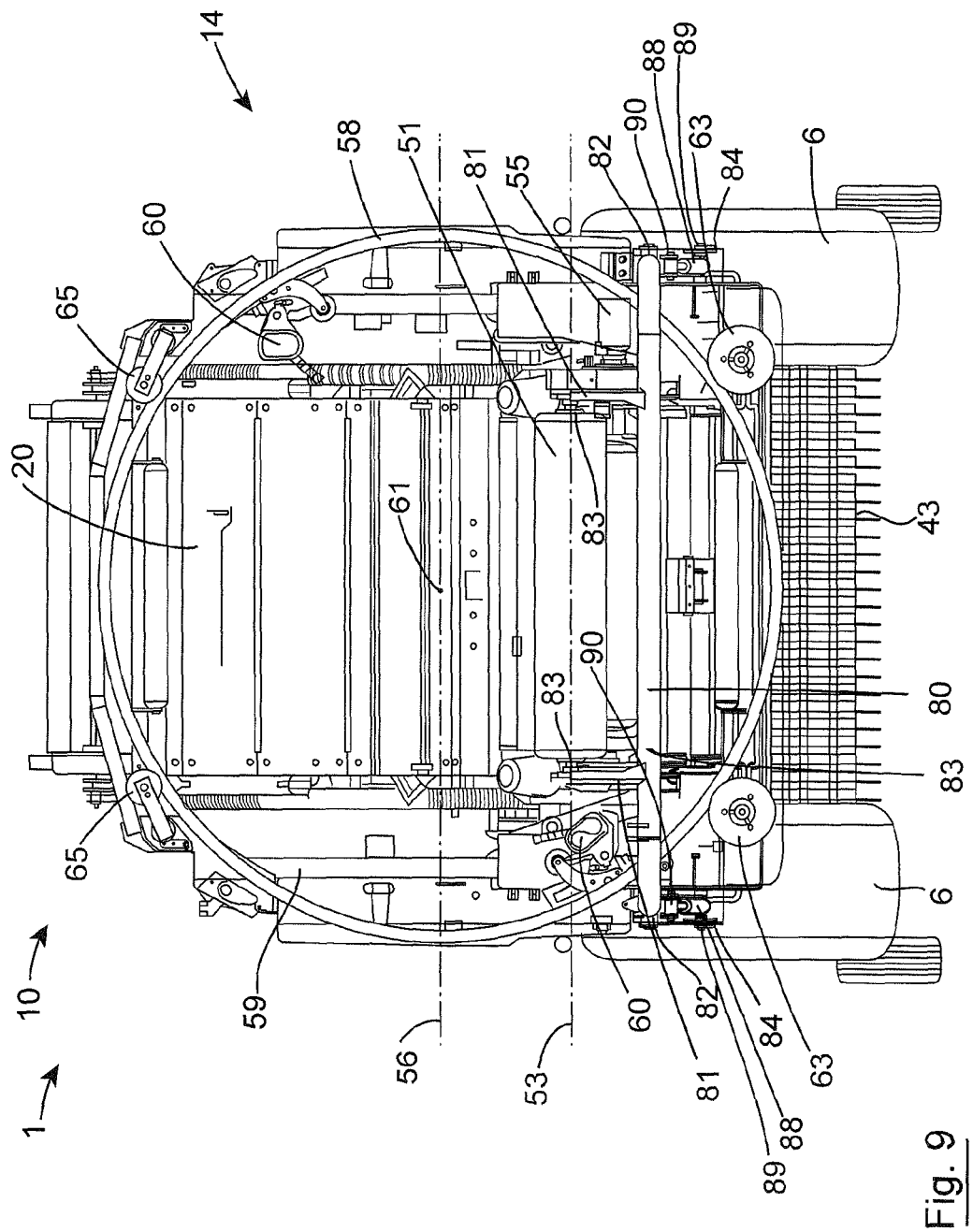
Figure 10:
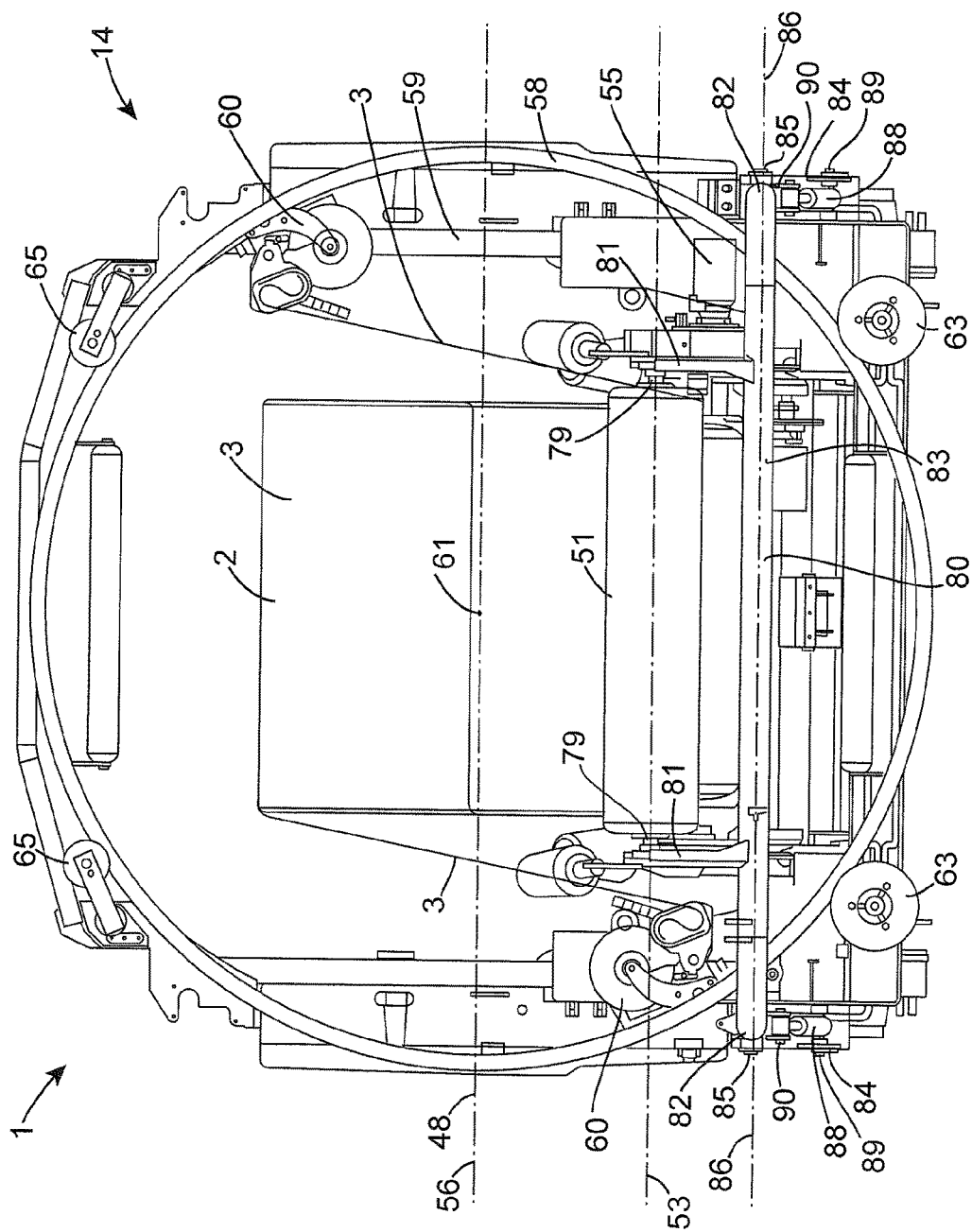
Figure 11:
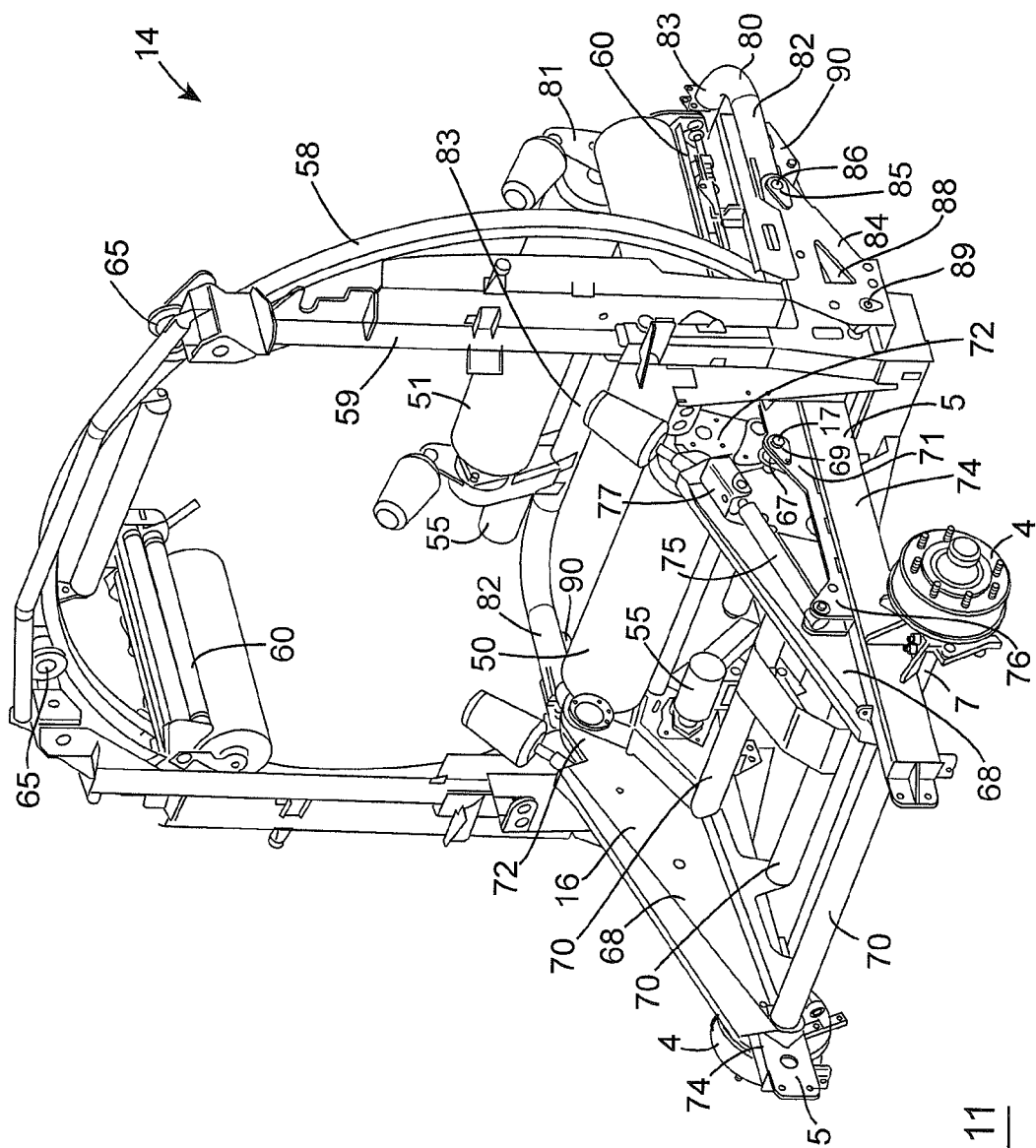
Figure 12:
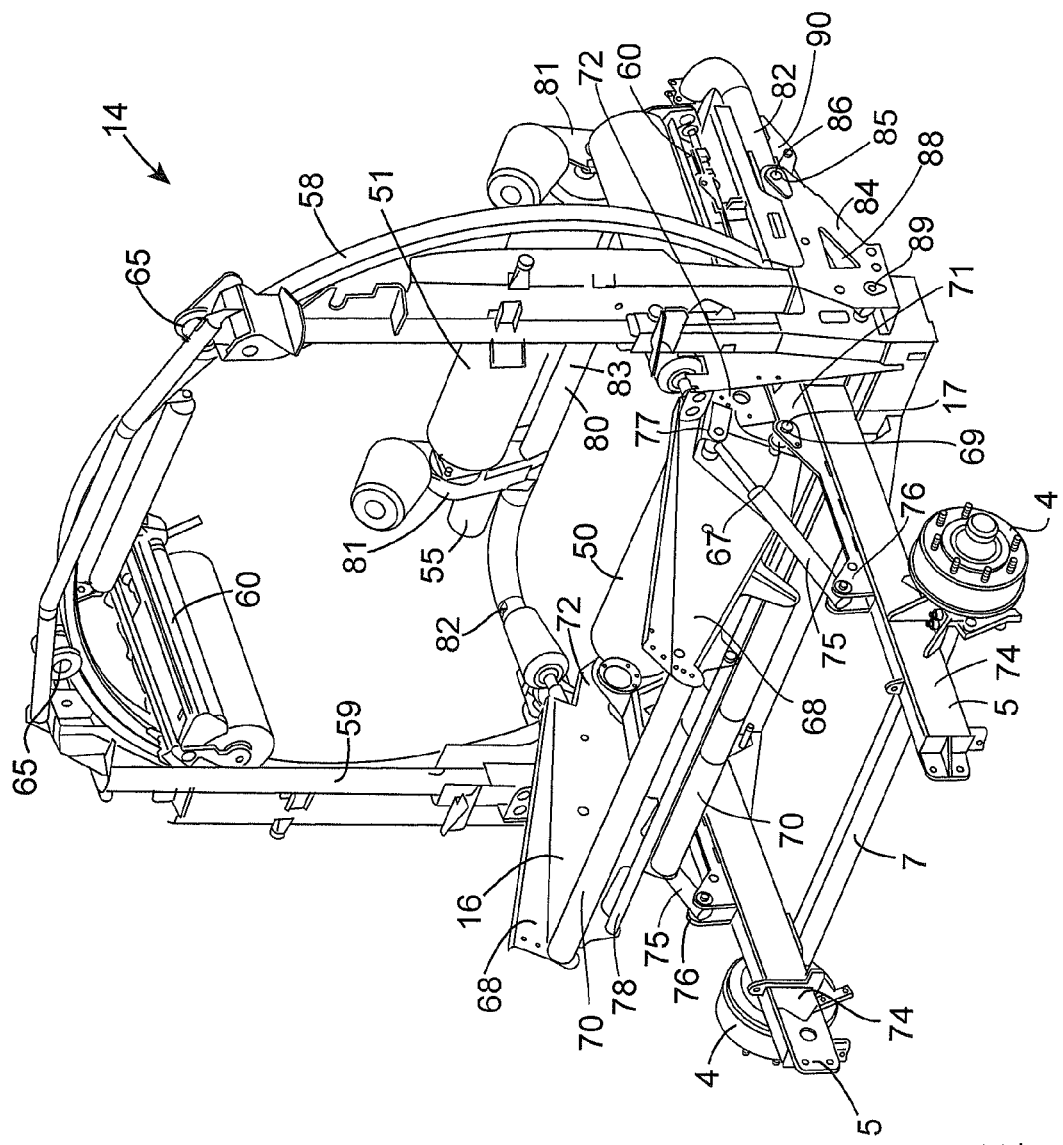
Figure 13:
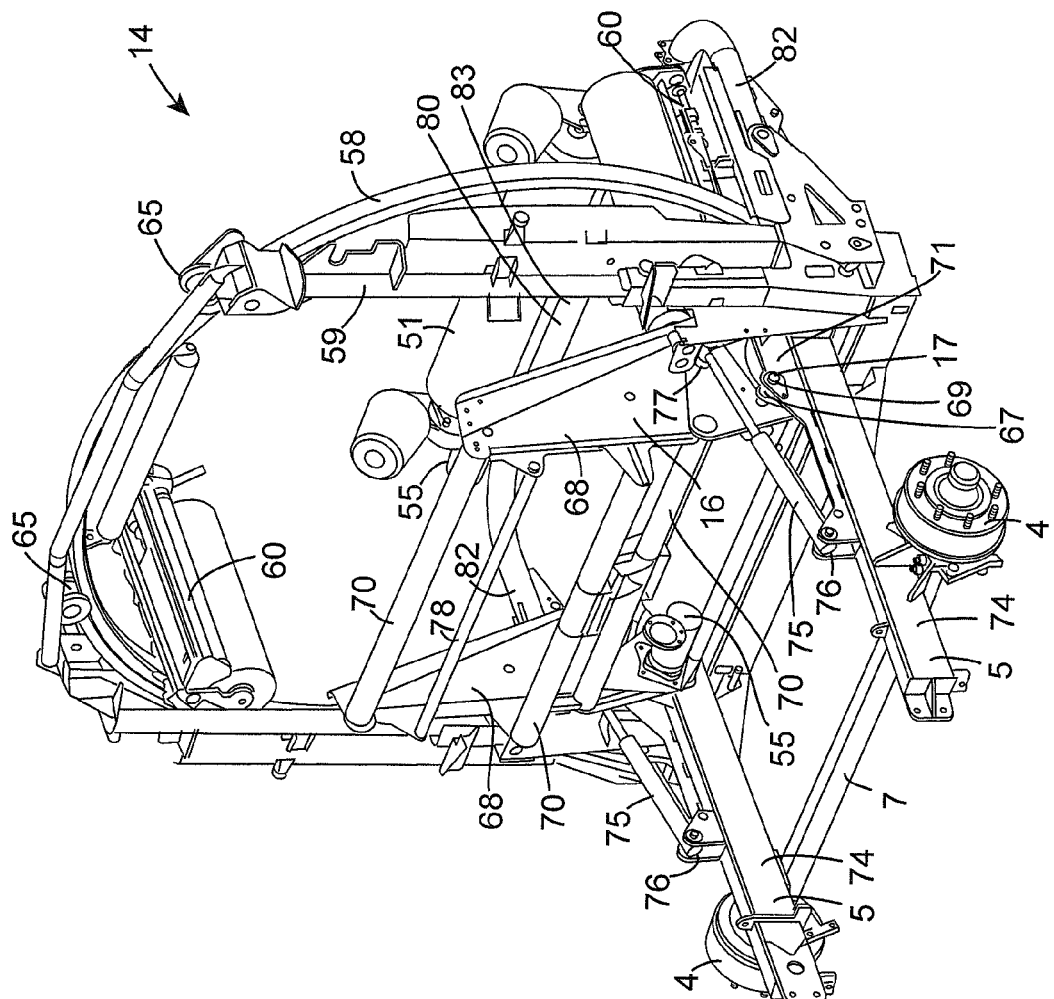
Figure 14:
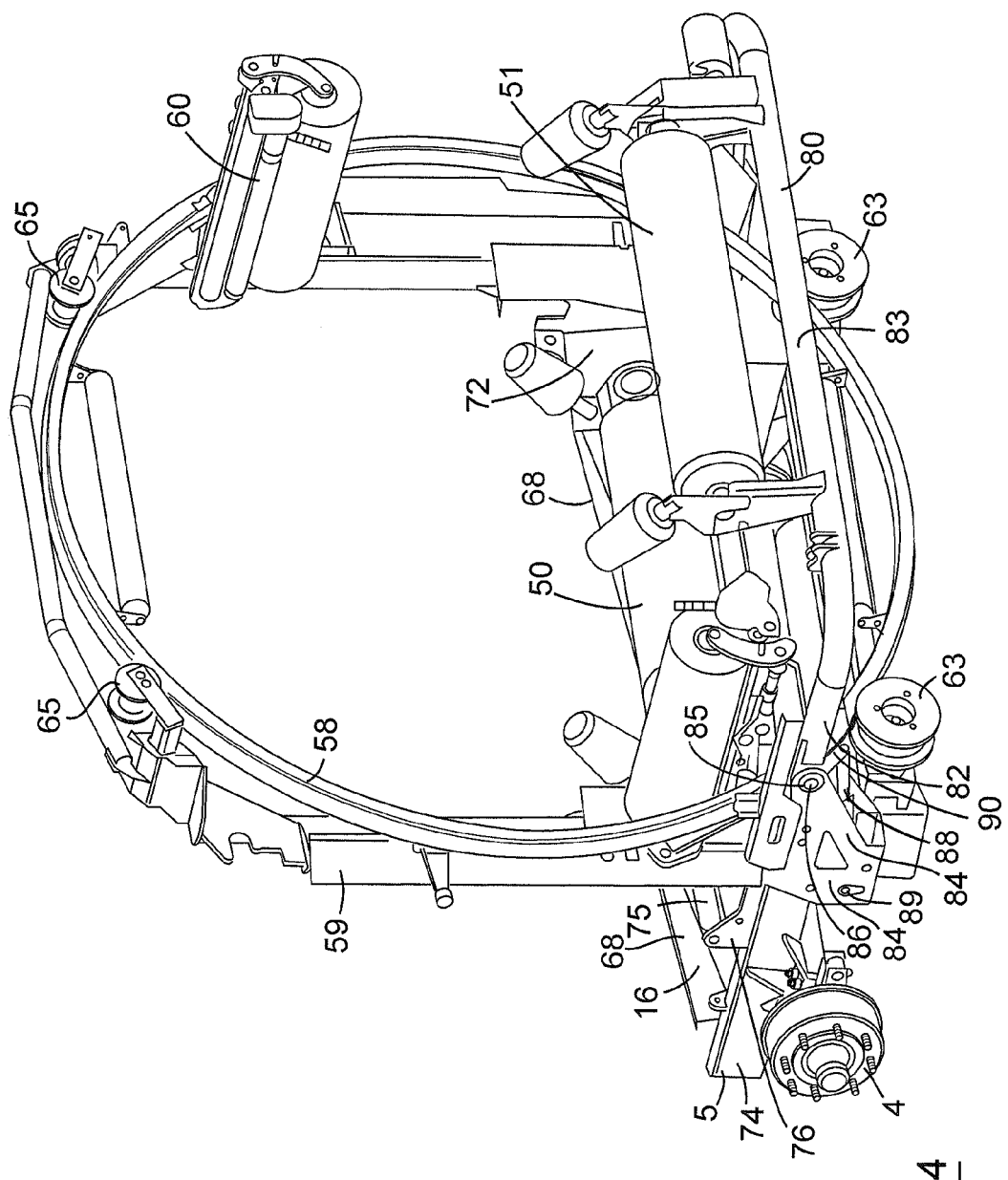
Figure 15:
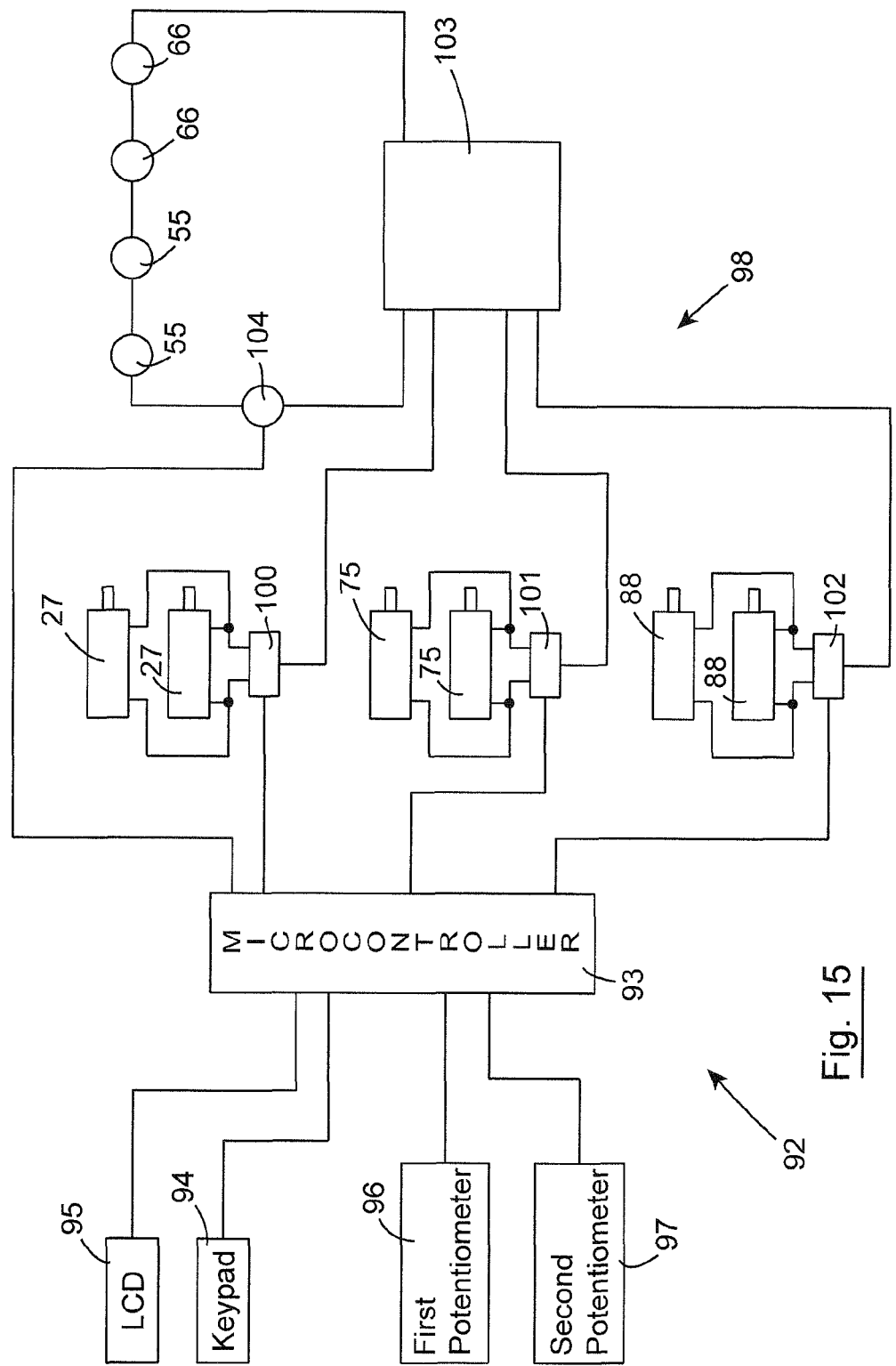
Figure 16:
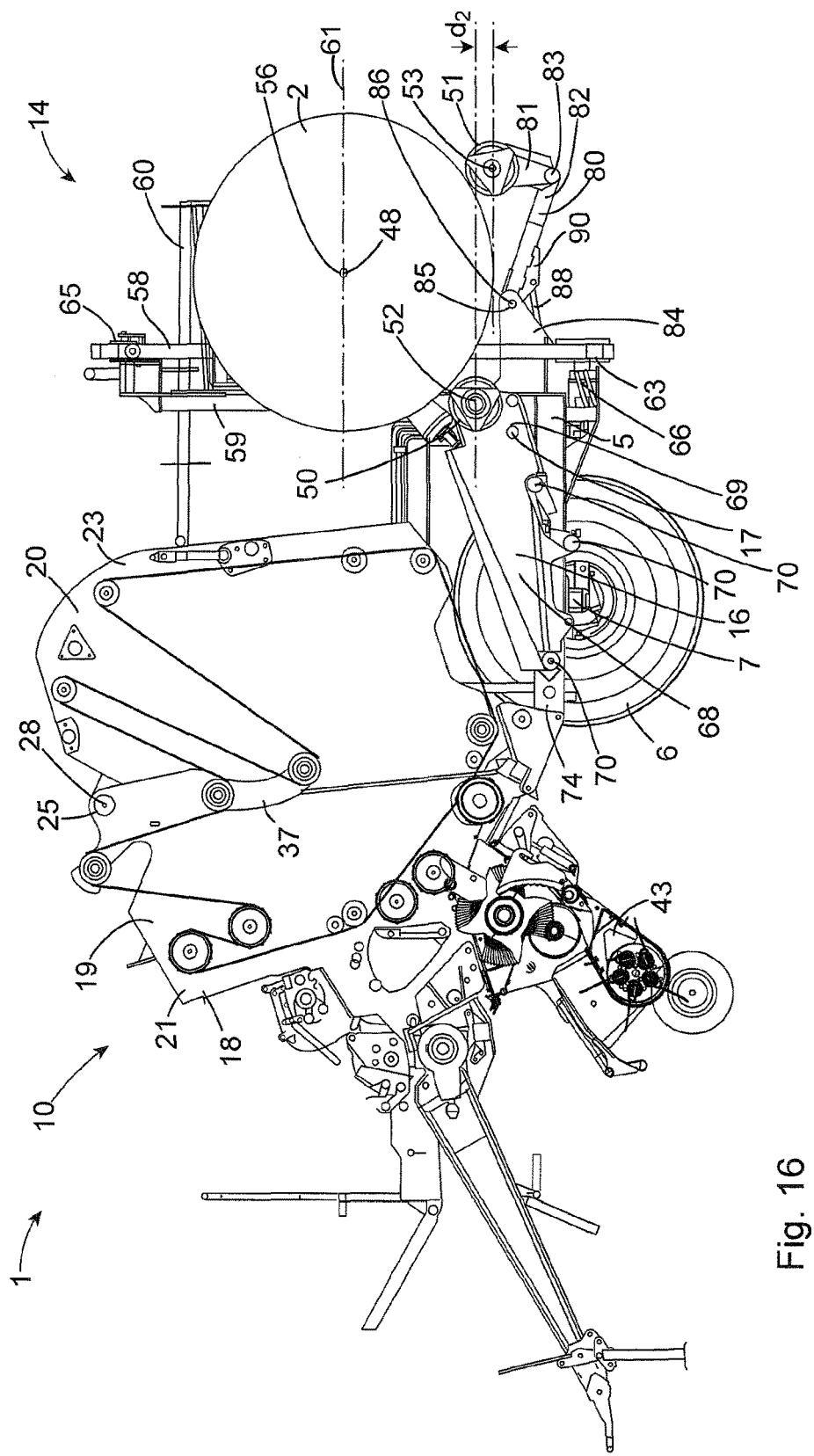

The invention will be more clearly understood from the following description of a preferred embodiment thereof, which is given by way of example only, with reference to the accompanying drawings, in which:

FIG. 1 is a perspective view of a combined baler/bale wrapper according to the invention, FIG. 2 is a cross-sectional side elevational view of the combined baler/bale wrapper of FIG. 1, FIG. 3 is another cross-sectional side elevational view of the combined baler/bale wrapper of FIG. 1, FIG. 4 is another cross-sectional side elevational view of the combined baler/bale wrapper of FIG. 1 illustrating a part of the combined baler/bale wrapper in a different state to that of FIGS. 1 and 2, FIG. 5 is another cross-sectional side elevational view of the combined baler/bale wrapper of FIG. 1 showing another part of the combined baler/bale wrapper in a different state to that of FIG. 1, FIG. 6 is another cross-sectional side elevational view of the combined baler/bale wrapper of FIG. 1 illustrating a portion of the combined baler/bale wrapper in a different state to that of both FIG. 2 and FIG. 5, FIG. 7 is a further cross-sectional side elevational view of the combined baler/bale wrapper of FIG. 1, FIG. 8 is another cross-sectional side elevational view of the combined baler/bale wrapper of FIG. 1 illustrating another part of the combined baler/bale wrapper in a different state to that of FIG. 2, FIG. 9 is a rear end elevational view of the combined baler/bale wrapper of FIG. 1, FIG. 10 is another rear end elevational view of the combined baler/bale wrapper of FIG. 1, FIG. 11 is a perspective view of a portion of the combined baler/bale wrapper of FIG. 1, FIG. 12 is a view similar to FIG. 11 illustrating a part of the portion of the combined baler/bale wrapper in a different state to that of FIG. 11, FIG. 13 is a view similar to FIG. 11 of the portion of the combined baler/bale wrapper of FIG. 11 illustrating the part of the portion of combined baler/bale wrapper in a still further different state to that of FIGS. 11 and 12, FIG. 14 is another perspective view of the portion of the combined baler/bale wrapper of FIG. 11, FIG. 15 is a circuit diagram of a control circuit of the combined baler/bale wrapper of FIG. 1, and FIG. 16 is another cross-sectional side elevational view of the combined baler/bale wrapper of FIG. 1, showing a portion of the combined baler/bale wrapper in a different state to that of FIGS. 1 and 7.

Referring to the drawings, there is illustrated a combined baler/bale wrapper according to the invention, indicated generally by the reference numeral 1, for forming a cylindrical bale of material, which in this embodiment of the invention is a bale 2 of forage material, and for wrapping the bale 2 with overlapping turns of wrapping material, namely, wrapping film 3 of plastics material. Such cylindrical bales of forage material as the bale 2 will be well known to those skilled in the art, and typically, such bales 2 are of silage material, hay, straw and the like. The wrapping film 3 is of an opaque plastics material, typically black or green in colour, which may or may not comprise a self-adhesive coating on one side thereof. Such bales and the wrapping thereof with wrapping film will be known to those skilled in the art.

In this embodiment of the invention the combined baler/bale wrapper 1 is suitable for producing and wrapping bales 2 of length of approximately 1.25 meters, and of selectable diameters in the range of 0.9 meters to 2.2 meters.

The combined baler/bale wrapper 1 comprises a chassis 5 which is carried on a pair of ground engaging wheels 6. The ground engaging wheels 6 are secured to respective hubs 4, which are rotatably carried on respective opposite ends of an axle 7 which is mounted on and extends transversely of the chassis 5. A hitch 8 is carried on an arm 9 which extends forwardly from the chassis 5 for hitching the combined baler/bale wrapper 1 to a prime mover, for example, a suitable towing vehicle, such as a tractor or the like.

A baler, indicated generally by the reference numeral 10, which in this embodiment of the invention comprises a belt baler, is mounted on the chassis 5 towards a forward end 11 thereof for sequentially forming the cylindrical bales 2. A bale wrapper also according to the invention and indicated generally by the reference numeral 14, for wrapping the bales 2 produced by the baler 10 is mounted on the chassis 5 towards a rearward end 15 thereof, and is thus located rearwardly of the baler 10.

The bale wrapper 14 comprises a transfer means, namely, a transfer element 16 which is pivotally coupled to the chassis 5 about a transfer pivot axis 17, and is located between the bale wrapper 14 and the baler 10 for sequentially receiving bales 2 discharged from the baler 10 and for sequentially transferring the bales 2 onto the bale wrapper 14 as will be described in detail below. The transfer pivot axis 17 of the transfer element 16 extends transversely of the normal forward direction of travel of the combined baler/bale wrapper 1, and in turn parallel to the axle 7 of the combined baler/bale wrapper 1.

Before describing the bale wrapper 14 and the transfer element 16 in detail, the baler 10 will first be described.

The baler 10 comprises a housing 18 which is formed by a forward stationary part 19 and a rearwardly moveable part, which forms a rear door 20. The stationary part 19 comprises a pair of opposite spaced apart side walls 21 which extend upwardly from the chassis 5. The rear door 20 comprises a pair of opposite spaced apart side walls 23 which are secured together by bracing bars 24 extending between the side walls 23. The spacing between the side walls 23 of the rear door 20 is substantially similar to the spacing between the side walls 21 of the stationary part 19. A pivot shaft 25 extending between and carried on the side walls 21 adjacent a top portion 26 thereof defines a door pivot axis 28, and the rear door 20 is pivotally carried on the pivot shaft 25 and is pivotal about the door pivot axis 28 in the directions of the arrows A and B between a closed state illustrated in FIGS. 1 to 3 during forming of a bale in the baler 10, and an open state illustrated in FIGS. 4 to 7 for accommodating discharge of a formed bale 2 from the baler 10 onto the transfer element 16. A pair of main hydraulic rams 27 illustrated only in FIGS. 1 and 15 acting between the rear door 20 and the stationary part 19 pivot the rear door 20 between the open and the closed states.

A plurality of side by side belts 29, only one of which is illustrated in the drawings, are carried around fixed position driven rollers 30, fixed position idler rollers 31 and tensioning rollers 32 for forming a bale 2 in the baler 10. The driven rollers 30 extend between the side walls 21 of the stationary part 19 and are rigidly carried on shafts 34 which are rotatably carried on bearings (not shown) in the side walls 21 of the stationary part 19. The idler rollers 31 extend between the side walls 23 of the rear door 20 and are rigidly carried on shafts 35 which are rotatably carried in bearings (not shown) in the side walls 23 of the rear door 20.

The tensioning rollers 32 extend between a pair of opposite spaced apart tensioning arms 37. The tensioning arms 37 are located within the rear door 20 adjacent corresponding ones of the side walls 23 and are pivotally carried on the pivot shaft 25. The tensioning rollers 32 are rotatably carried on shafts 39 which extend rigidly between the tensioning arms 37 for securing the tensioning arms 37 together. Two pairs of tensioning springs 36 acting between the tensioning arms 37 and the door 20 on respective opposite sides of the baler 10 tension the tensioning arms 37 to induce tension in the belts 29 in order to compact the forage material as the bale is being formed. The tensioning springs 36 act on the tensioning arms 37 to urge the tensioning arms 37 in the direction of the arrow C about the pivot shaft 25 to take up slack in the belts 29 while the bale is being formed in the baler 10, and in turn to compact the forage material as the bale is being formed. This aspect of the belt baler will be understood by those skilled in the art. A pair of tensioning rams 38 acting between the door and corresponding connector elements 33, which couple the tensioning springs 36 to the tensioning arms 37, provide for adjustment of the tension induced in the belts 29 by the tensioning springs 36. The tensioning springs 36 and the tensioning rams 38 are illustrated only in FIG. 1 and on one side only of the baler 10.

Three bale rotating rollers 40 extend between the side walls 21 of the stationary part 19 and are rigidly carried on shafts 41 which are rotatably carried in bearings (not shown) in the side walls 21. The bale rotating rollers 40 form with the belts 29 as the bale is being formed a bale forming chamber 42, the diameter of which increases as the bale 2 is being formed and as the slack in the belts 29 taken up by the tensioning rollers 32 is reduced as the tensioning arms 37 pivot in the direction of the arrow P, see FIG. 3. This aspect of the baler 10 and the increasing diameter of the bale forming chamber 42 during formation of a bale will be well known to those skilled in the art.

A drive transmission (not shown), which is driven from the power take-off shaft of the towing vehicle, such as a tractor, is provided for driving the bale rotating rollers 40 and for driving the driven rollers 30 for in turn driving the belts 29 for rotating the bale being formed in the bale forming chamber 42 during formation thereof.

A pick-up mechanism 43 mounted on the chassis 5 extends downwardly and forwardly from the baler 10 for picking up forage material and feeding the forage material into the bale forming chamber 42 between two of the bale rotating rollers, namely, the bale rotating rollers 40a and 40b as the bale 2 is being formed therein. The drive transmission (not shown) which is driven from the power take-off shaft of the towing vehicle drives the pick-up mechanism 43.

The side walls 21 of the stationary part 19 of the baler 10 define a rearwardly facing open mouth 45 for accommodating discharge of a formed bale 2 from the bale forming chamber 42 when the rear door 20 is in the open state. The open mouth 45 defines a plane 46 which extends transversely of the normal forward direction of travel of the combined baler/bale wrapper 1, and is generally upwardly forwardly inclined relative to a transverse substantially vertically extending plane 47. In this embodiment of the invention the inclined plane 46 defined by the open mouth 45 defines an angle α with the vertical plane 47 of approximately 5°, see FIGS. 2 and 4.

It has been found that by locating the stationary part 19 of the baler 10 with the open mouth 45 defined by the stationary part 19 defining the plane 46 which inclines in a generally upwardly forwardly direction at the angle α of approximately 5° to the vertical plane 47 optimises the clearance between the stationary part 19 of the baler 10 and the bale wrapper 14 which is required in order to facilitate pivoting of the rear door 20 between the closed state and the open state, while at the same time not inhibiting discharge of a bale 2 from the bale forming chamber 42 onto the transfer element 16. However, it will be appreciated that if the spacing between the baler 10 and the bale wrapper 14 is not critical, the angle α between the plane 46 defined by the open mouth 45 and the vertical plane 47 may be reduced to zero, or indeed to −15°, whereby the negative values of the angle α indicate the plane 46 defined by the open mouth 45 inclining upwardly in a generally rearwardly direction to the vertical plane 47. It is also envisaged in certain cases that the angle α between the plane 46 defined by the open mouth 45 and the vertical plane 47 may lie between +30° and −30°.

The baler 10 is mounted on the chassis 5 so that the bales 2 are formed in the bale forming chamber 42 with the main longitudinally extending central geometrical axis 48 of the bale 2 extending transversely of the normal forward direction of travel of the combined baler/bale wrapper 1. In other words, the bales 2 are formed in the bale forming chamber 42 of the baler 10 with the main longitudinally extending central geometrical axis 48 of the bale 2 extending substantially parallel to the axle 7 of the combined baler/bale wrapper 1. Accordingly, when the formed bale 2 is discharged from the baler 10 onto the transfer element 16, the main longitudinally extending central geometrical axis 48 of the bale 2 extends parallel to the transfer pivot axis 17 of the transfer element 16.

Turning now to the bale wrapper 14, the bale wrapper 14 comprises a pair of spaced apart parallel first and second rotatably mounted bale support rollers, namely, a first bale support roller 50, and a second bale support roller 51, which are rotatable about respective parallel spaced apart first and second rotational axes 52 and 53. The first and second bale support rollers 50 and 51 extend parallel to the axle 7 of the combined baler/bale wrapper 1 and support the bale 2 to be wrapped with the longitudinally extending main central geometrical axis 48 of the bale 2 extending parallel to the first and second bale support rollers 50 and 51. The first and second bale support rollers 50 and 51 are driven by a first drive means, namely, a pair of synchronised first hydraulically powered rotary motors 55 through a suitable chain drive transmission (not shown) for rotating each bale 2 about a first wrapping axis 56 which coincides with the longitudinally extending main central geometrical axis 48 of the bale 2 during wrapping of the bale 2. The mounting of the first and second bale support rollers 50 and 51 will be described in detail below.

A carrier means comprising a substantially vertically extending circular carrier ring 58 is rotatably mounted on a support frame 59 extending upwardly from the chassis 5, and carries a pair of wrapping film dispensers 60 located at 180° intervals around the carrier ring 58. The wrapping film dispensers 60 are rigidly mounted on the carrier ring 58 so that as the carrier ring 58 rotates, the wrapping film dispensers 60 are revolved through a locus of travel around a second wrapping axis 61 for dispensing the wrapping film 3 from the wrapping film dispensers 60 onto a bale 2 being rotated on the first and second bale support rollers 50 and 51 about the first wrapping axis 56. The carrier ring 58 defines a carrier plane 57 which contains the locus of travel of the wrapping film dispensers 60, and in this embodiment of the invention extends substantially vertically.

A pair of double flanged driven rollers 63 which are rotatably mounted on the support frame 59 adjacent a lower end thereof support and drive the carrier ring 58 about the second wrapping axis 61. A pair of spaced apart double flanged idler rollers 65 rotatably carried on the support frame 59 adjacent an upper end thereof rotatably engage the carrier ring 58 and co-operate with the double flanged driven rollers 63 for retaining the carrier ring 58 in a substantially vertical orientation. The support frame 59 and the double flanged drive and idler rollers 63 and 65 are configured relative to the chassis 5 so that the carrier ring 58 extends substantially transversely of the normal forward direction of travel of the combined baler/bale wrapper 1. Accordingly, the carrier plane 57 defined by the carrier ring 58 extends substantially transversely of the normal forward direction of travel of the combined baler/bale wrapper 1 with the second wrapping axis 61 extending substantially horizontally and perpendicularly relative to the first wrapping axis 56. In other words, the second wrapping axis 61 extends in a general longitudinal direction relative to the normal forward direction of travel of the combined baler/bale wrapper 1. In this embodiment of the invention the carrier ring 58 and in turn the carrier plane 57 are located between the first and second bale support rollers 50 and 51 and are located closer to the first bale support roller 50 than to the second bale support roller 51 for a reason to be described below.

A second drive means, namely, a pair of synchronised second hydraulically powered rotary motors 66 mounted on the support frame 59 drive the double flanged drive rollers 63 for in turn rotating the carrier ring 58 in order to revolve the wrapping film dispensers 60 along the locus of travel which is substantially defined by the carrier ring 58 around the second wrapping axis 61, and in turn around the bale 2 as the bale 2 is being rotated about the first wrapping axis 56 by the first and second bale support rollers 50 and 51.

Turning now to the transfer element 16 for transferring a bale 2 onto the first and second bale support rollers 50 and 51 of the bale wrapper 14, the transfer element 16 comprises a pair of parallel spaced apart side members 68 which are joined by three spaced apart parallel carrier members 70 of circular cross-section tubular steel, and which extend transversely between the side members 68 and are rigidly secured to the side members 68 for rigidly joining the side members 68. A pair of pivot shafts 69 extend sidewardly outwardly of the transfer element 16 and are rigidly secured to and extend from the respective side members 68. The pivot shafts 69 are pivotally carried in bearings 67 in mounting brackets 71, which are mounted on opposite spaced apart side members 74 of the chassis 5 for pivotally mounting the transfer element 16 on the chassis 5. One of the pivot shafts 69 and its mounting are clearly illustrated in the perspective views of FIGS. 11 to 13. The pivot shafts 69 are aligned with each other and define the transfer pivot axis 17. The transfer element 16 is pivotal about the transfer pivot axis 17 in the direction of the arrow D from a first state illustrated in FIGS. 4 and 11 for receiving a bale 2 from the baler 10 to a second state illustrated in FIGS. 6 and 13 for transferring the bale 2 onto the bale wrapper 14. The carrier members 70 are located in the transfer element 16 to act as a receiving means for receiving a bale 2 discharged from the baler 10. A crossbar 78 also extending transversely between the side members 68 is rigidly secured to the side members 68 for further reinforcing the transfer element 16.

A pair of parallel spaced apart mounting brackets 72 extending from the respective side members 68 of the transfer element 16 are located on the side members 68 on the opposite side of the transfer pivot axis 17 to that on which the three carrier members 70 are located, and carry the first bale support roller 50, which is also located on the transfer element 16 on the opposite side of the transfer pivot axis 17 to that of the carrier members 70. The first bale support roller 50 is rigidly secured to a first shaft 73 which extends between and is rotatably carried in bearings (not shown) on the mounting brackets 72. The first shaft 73 of the first bale support roller 50 defines the first rotational axis 52 about which the first bale support roller 50 is rotatable, and the first rotational axis 52 extends parallel to the transfer pivot axis 17. The first hydraulic motor 55 which drives the first bale support roller 50 is mounted on one of the mounting brackets 72 of the transfer element 16.

A first urging means comprising a pair of first double-acting hydraulic ram 75 acting between respective brackets 76 on the side members 74 of the chassis 5 and brackets 77 on the side members 68 of the transfer element 16 urge the transfer element 16 about the transfer pivot axis 17 in the direction of the arrow D from the first state illustrated in FIGS. 4 and 11 to the second state illustrated in FIGS. 6 and 13 for transferring a formed bale 2 discharged from the baler 10 onto the bale wrapper 14.

Since the first bale support roller 50 is located on the transfer element 16 to the side of the transfer pivot axis 17 which is opposite to the side of the transverse pivot axis 17 on which the three carrier members 70 are located, as the transfer element 16 is being pivoted from the first state to the second state with the carrier members being urged generally upwardly for transferring a bale 2 onto the bale wrapper 14, the first bale support roller 50 is urged in a generally downwardly direction in the direction of the arrow F from a bale wrapping state illustrated in FIGS. 2, 3 and 11 to a downwardly displaced state illustrated in FIG. 6. This significantly reduces the headroom required by the bale 2 during transfer of the bale 2 onto the bale wrapper 14. In other words, the headroom available to the bale 2 during transfer of the bale 2 onto the bale wrapper 14, which is restricted by the carrier ring 58, is increased. By increasing the headroom available to the bale during transfer of the bale onto the bale wrapper 14 by urging the first bale support roller 50 downwardly into the downwardly displaced state, increased headroom is available to the bale without having to alter the diameter of the carrier ring 58. This, thus, allows the diameter of the carrier ring 58 to be minimised, which in turn reduces the overall width of the combined baler/bale wrapper. Additionally, by virtue of the fact that the first bale support roller 50 is urged downwardly from the bale wrapping state as the transfer element 16 is being pivoted from the first state to the second state allows the transfer element 16 to be located in the first state at a significantly lower level relative to the baler 14, than could otherwise be achieved, and still transfer the bale onto the bale wrapper 14. This in turn allows the baler 10 to be located on the chassis 5 at a lower level than could otherwise be achieved, while still allowing discharged of a bale from the baler 10 onto the transfer element 16 in the first state. This is a particular advantage when the combined baler/bale wrapper comprises a rear door baler.

Once the bale 2 has been transferred onto the bale wrapper 14, the transfer element 16 is returned in the direction of the arrow E by the first hydraulic rams 75 from the second state to the first state, thereby returning the first bale support roller 50 to the bale wrapping state with the bale 2 supported on the first and second bale support rollers 50 and 51 ready for wrapping, see FIGS. 6 and 7.

Additionally, the pivot shafts 69 are pivotally mounted in the mounting brackets 71 in the chassis 5 at a level which is below the level of a horizontal plane containing the first rotational axis 52 of the first bale support roller 50 when the first bale support roller 50 is in the bale wrapping state, and is also below a plane containing the first and second rotational axes 52 and 53 of the first and second bale support rollers 50 and 51, when the first and second bale support rollers 50 and 51 are in the bale wrapping state. This further increases the headroom available to the bale 2 during transfer of the bale 2 by the transfer element 16 onto the bale wrapper 14.

The second bale support roller 51 is mounted fast on a second shaft 79 which is rotatably carried on a mounting element, namely, a carrier frame 80 which extends rearwardly from the chassis 5. The carrier frame 80 in this embodiment of the invention is of U-shape construction and comprises a pair of side members 82 joined by a cross-member 83, see FIGS. 9, 10 and 14. A pair of spaced apart carrier plates 81, which are rigidly carried on and extend upwardly from the cross-member 83 of the carrier frame 80, rotatably carry the second shaft 79 of the second bale support roller 51 about the second rotational axis 53 thereof. Bearings (not shown) in the carrier plates 81 rotatably carry the second shaft 79. The first hydraulic motor 55 which drives the second bale support roller 51 is mounted on one of the carrier plates 81 which are mounted on the carrier frame 80.

The carrier frame 80 is pivotally coupled to the chassis 5 by a pair of pivot shafts 85 which extend rigidly outwardly from the side members 82 of the carrier frame 80, and which are pivotally carried in bearings (not shown) in corresponding mounting plates 84 which are secured to the respective side members 74 of the chassis 5 adjacent the rear end 15 thereof. The pivot shafts 85 are aligned with each other and define a common pivot mounting axis 86 about which the carrier frame 80 is pivotal between any one of a plurality of selectable bale wrapping states for supporting the second bale support roller 51 in any one of a corresponding number of selectable bale wrapping states, with the second bale support roller 51 co-operating with the first bale support roller 50 in the bale wrapping state for supporting bales 2 of different diameters during wrapping thereof, for maximising the headroom available to the bales 2 during wrapping thereof.

By pivoting the carrier frame 80 about the common pivot mounting axis 86, the level of the second rotational axis 53 of the second bale support roller 51 can be varied upwardly or downwardly through a plurality of selectable levels relative to the level of a horizontal plane containing the first rotational axis 52 of the first bale support roller 50 when the first bale support roller 50 is in the bale wrapping state. The selectable levels of the second rotational axis 53 of the second bale support roller 51 relative to the horizontal plane containing the first rotational axis 52 of the first bale support roller 50 correspond to the selectable bale wrapping states of the second bale support roller 51.

Accordingly, the second bale support roller 51 is operable in a plurality of selectable bale wrapping states with the second rotational axis 53 of the second bale support roller 51 at a plurality of selectable levels at respective distances $d_1$ above the level of the horizontal plane containing the first rotational axis 52 of the first bale support roller 50 when the first bale support roller is in the bale wrapping state, and at a plurality of selectable bale wrapping states with the level of the second rotational axis 53 of the second bale support roller 51 at a plurality of selectable levels at distances $d_2$ below the level of the horizontal plane containing the first rotational axis 52 of the first bale support roller 50 when the first bale support roller 50 is in the bale wrapping state. In FIGS. 2, 3 and 7 the first and second bale support rollers 50 and 51 are illustrated with the first bale support roller 50 in the bale wrapping state, and the second bale support roller 51 in a selectable one of the bale wrapping states with the level of the second rotational axis 53 of the second bale support roller 51 at a level a distance $d_1$ above the horizontal plane containing the first rotational axis 52 of the first bale support roller 50.

In FIG. 16 the second bale support roller 51 is illustrated in another one of the selectable bale wrapping states with the second rotational axis 53 of the second bale support roller 51 at a level $d_2$ below the horizontal plane containing the first rotational axis 52 of the first bale support roller 50.

In this embodiment of the invention the carrier frame 80 is pivotal about the common pivot mounting axis 86 for urging the second bale support roller 51 through the selectable ones of the bale wrapping states from a lower level with the level of the second wrapping axis 53 of the second bale support roller 51 at a maximum distance $d_2$ of 100 mm below the horizontal axis containing the first rotational axis 52 of the first bale support roller 50 when the first bale support roller 50 is in the bale wrapping state, to an upper level with the level of the second rotational axis 53 of the second bale support roller 51 at a maximum distance $d_1$ of 100 mm above the horizontal plane containing the first rotational axis 52 of the first bale support roller 50 when the first bale support roller 50 is in the bale wrapping state.

However, it is envisaged that in certain cases the carrier frame 80 may be pivotal about the common pivot mounting axis 86 for urging the second bale support roller 51 between the lower level with the level of the second rotational axis 53 of the second bale support roller 51 at a maximum distance $d_2$ of 200 mm below the horizontal plane containing the first rotational axis 52 of the first bale support roller 50 when the first bale support roller 50 is in the bale wrapping state, and an upper level with the level of the second rotational axis 53 of the second bale support roller 51 at a maximum distance $d_1$ of 200 mm above the horizontal plane containing the first rotational axis 52 of the first bale support roller 50 with the first bale support roller 50 in the bale wrapping state, although, in general, it is envisaged that the maximum value of the distance d2 would not exceed 300 mm and the maximum value of the distance d1 would not exceed 300 mm.

The bale wrapping state of the second bale support roller 51 is selected so that the headroom available to the bales during wrapping is maximised. In the case of bales is of relatively small diameter, the bale wrapping state of the second bale support roller 51 is selected so that the level of the second rotational axis 53 of the second bale support roller 51 is at a level above the horizontal plane containing the first rotational axis 52 of the first bale support roller 50. For the bales of the smallest diameter for which the combined baler/bale wrapper 1 is configured to produce, the second bale support roller 51 is set with the level of the second rotational axis 53 of the second bale support roller 51 at the maximum level $d_1$ above the horizontal plane containing the first rotational axis 52 of the first bale support roller 50. As the diameter of the bales produced by the baler 10 increases, the bale wrapping state of the second bale support roller 51 is selected so that the level of the second rotational axis 53 of the second bale support roller 51 above the horizontal plane containing the first rotational axis 52 of the first bale support roller 50 is reduced. As the diameter of the bales produced by the baler 10 increases further, the bale wrapping state of the second bale support roller 51 is selected so that the level of the second rotational axis 53 of the second bale support roller 51 is located at a level below the horizontal plane containing the first rotational axis 52 of the first bale support roller 50, and the level of the second rotational axis 53 of the second bale support roller 51 below the horizontal plane containing the first rotational axis 52 of the first bale support roller 50 is further increased as the diameter of the bales 2 increases further. Thus, the headroom available to the bale, which is restricted by the locus of travel of the wrapping film dispenser 60 is maximised during wrapping of the bale.

By configuring the second bale support roller 51 to be operable in a plurality of selectable bale wrapping states for accommodating bales 2 of different diameters, the headroom available to the bales 2 during wrapping thereof which is restricted by both the carrier ring 58 and the wrapping film dispensers 60 as the wrapping film dispensers 60 pass between the carrier ring 58 and the rotating bale 2 above the rotating bale is maximised without the need to increase the diameter of the carrier ring 58, and thus the overall width of the combined baler/bale wrapper is minimised.

The horizontal spacing between the first and second bale support rollers 50 and 51 for all wrapping states of the second bale support roller 51 is greater than the width of the wrapping film 3 in order to accommodate the wrapping film as it is being dispensed from the wrapping film dispensers 60 onto the bale 2 as the wrapping film dispensers 60 pass beneath the rotating bale 2.

The carrier frame 80 is also pivotal about the common pivot mounting axis 86 in the direction of the arrows G and H between each and every one of the selectable bale wrapping states and a discharge state illustrated in FIG. 8 for discharging a wrapped bale from the bale wrapper 14.

As discussed above, the carrier ring 58 is located closer to the first bale support roller 50 than to the second bale support roller 51 in order that the lower portion of the carrier ring 58 does not impede discharge of a wrapped bale from the bale wrapper 14.

A second urging means comprising a pair of second double-acting hydraulic rams 88 acting between the respective mounting plates 84 at locations 89 and brackets 90 mounted on the side members 82 of the carrier frame 80 pivots the carrier frame 80 about the common pivot mounting axis 86 for setting and retaining the second bale support roller 51 in a selected one of the selectable bale wrapping states in response to the diameter of the bale produced by the baler 10, and also operates the carrier frame 80 between the selected bale wrapping state and the discharge state for discharging a wrapped bale from the bale wrapper 14.

Referring now in particular to FIG. 15, a control means, namely, a control circuit 92 will now be described for controlling the operation of the combined baler/bale wrapper for producing a wrapped bale 2.

The control circuit 92 comprises a signal processor, namely, a microcontroller 93. An input means, which may be a keypad in conjunction with an liquid crystal display screen, or may be a touch-screen, and in this embodiment of the invention comprises a keypad 94 and a liquid crystal display screen 95, are mounted on the baler 10 and communicate with the microcontroller 93 for facilitating inputting of various commands to the microcontroller 93 for operating the combined baler/bale wrapper 1, and also for inputting a selected diameter to which the bale 2 is to be formed by the baler 10.

A first monitoring means for monitoring a characteristic of the baler 10 for determining the diameter of the bale as the bale is being formed in the baler 10, in this embodiment of the invention comprises a first rotary potentiometer 96 which is mounted on the pivot shaft 25 for detecting the angular movement of the tensioning arms 37 of the baler 10 from their initial rest position illustrated in FIG. 1 prior to commencement of forming of a bale in the baler 10. By detecting the angular position of the tensioning arms 37 relative to their rest position, the diameter of the bale can be determined, since the diameter of the bale is proportional to the angular displacement of the tensioning arms 37 from their rest position. Signals from the first rotary potentiometer 96 are read by the microcontroller 93, which in turn computes the current diameter of the bale 2 as the bale is being formed by the baler 10.

A second monitoring means for monitoring the angular position of the carrier frame 80 relative to the mounting plates 84, and in turn for monitoring the current bale wrapping state of the second bale support roller 51 comprises a second rotary potentiometer 97 mounted on one of the pivot shafts 85 for monitoring the angular displacement of the carrier frame 80 relative to the mounting plates 84, and in turn the current bale wrapping state of the second bale support roller 51. By knowing the angular displacement of the carrier frame 80 relative to the mounting plates 84, the level of the second rotational axis 53 of the second bale support roller 51 above or below the horizontal plane containing the first rotational axis 52 of the first bale support roller 50 can be readily computed. The microcontroller 93 reads signals from the second rotary potentiometer 97 and computes the current bale wrapping state of the second bale support roller 51.

An hydraulic control circuit 98 is operated under the control of the microcontroller 93 for controlling the operation of the main hydraulic rams 27 for pivoting the rear door 20 of the baler 10 in the direction of the arrows A and B between the closed state and the open state, respectively. The hydraulic circuit 98 also controls the operation of the first hydraulic rams 75 for pivoting the transfer element 16 in the direction of the arrows D and E between the first and second states thereof. Additionally, the hydraulic circuit 98 controls the operation of the second hydraulic rams 88 for pivoting the carrier frame 80 in the directions of the arrows G and H for urging the second bale support roller 51 into a selected one of the selectable bale wrapping states, and also for pivoting the carrier frame 80 between the selected one of the bale wrapping states and the discharge state. Solenoid controlled hydraulic valves 100, 101 and 102 operating under the control of the microcontroller 93 control the supply of hydraulic fluid from a pressurised hydraulic fluid source 103 to the main hydraulic rams 27, the first hydraulic rams 75 and the second hydraulic rams 88, respectively, for appropriately operating the main hydraulic rams 27 and the first and second hydraulic rams 75 and 88 under the control of the microcontroller 93.

A look-up table is stored in the microcontroller 93 with diameters of bales cross-referenced with appropriate bale wrapping states of the second bale support roller 51. The microcontroller 93 is programmed to read the appropriate bale wrapping state for the second bale support roller 51 from the look-up table corresponding to the selected diameter of the bale 2, in response to the selected diameter of the bale 2 being inputted through the key pad 94. The microcontroller 93 operates the solenoid valve 102 to in turn operate the second hydraulic rams 88 to set the carrier frame 80 for in turn setting the second bale support roller 51 in the appropriate bale wrapping state. The microcontroller 93 continuously reads signals from the second rotary potentiometer 97 during setting of the second bale support roller 51 in the appropriate bale wrapping state to determine when the second bale support roller 51 is in the appropriate bale wrapping state. The microcontroller 93 also continuously reads signals from the second rotary potentiometer 97 during wrapping of the bale 2 and operates the solenoid controlled hydraulic valve 102 for in turn operating the second hydraulic rams 88 for maintaining the second bale support roller 51 in the appropriate bale wrapping state in response to the signals received from the second rotary potentiometer 97.

The first and second hydraulically powered rotary motors 55 and 66 are connected in series in order to synchronise the speeds of the first and second motors 55 and 66. Hydraulic fluid is supplied to the first and second motors 55 and 66 from the pressurised hydraulic fluid source 103 through a variable flow control valve 104 under the control of the microcontroller 93 for controlling the speed of the first and second hydraulic motors 55 and 66 for in turn controlling the rotational speeds of the first and second bale support rollers 50 and 51 and the carrier ring 58.

In use, with the combined baler/bale wrapper 1 hitched to a towing vehicle, such as, for example, a tractor, and with the power take-off shaft of the tractor coupled to the drive transmission (not shown) of the combined baler/bale wrapper 1 for rotating the driven rollers 30 to drive the belts 29, the bale rotating rollers 40 and for operating the pick-up mechanism 43, as well for powering the pressurised hydraulic fluid source 103 of the hydraulic circuit 98, the combined baler/bale wrapper 1 is ready for use. The desired diameter to which the bales 2 are to be formed by the baler 10 is selected and inputted to the microcontroller 93 through the keypad 94. Other selectable control parameters of the combined baler/bale wrapper 1 which will be well known to those skilled in the art are also inputted to the microcontroller 93 through the keypad 94. With the rear door 20 of the baler 10 in the closed state ad with the transfer element 16 in the first state, the combined baler/bale wrapper 1 is then towed by the towing vehicle along a sward of cut grass, hay, straw or other forage material to be baled with the pick-up mechanism 43 picking up the forage material from the sward and delivering the forage material to the baler 10 through the bale rotating rollers 40a and 40b.

As the forage material is urged by the pick-up mechanism 43 through the bale rotating rollers 40a and 40b, the belts 29 are urged away from the bale rotating rollers 40 to commence the formation of the forage material into a bale with the bale rotating rollers 40 and the belts 29 forming the bale forming chamber 42. The action of the bale rotating rollers 40 which are rotated in the direction of the arrow K and the belts 29 which are urged by the driven rollers 30 in the direction of the arrow L commence rotation of the forage material in the bale forming chamber 42 in the direction of the arrow N, see FIG. 3, which in turn commences the formation of the cylindrical bale 2. As more forage material is urged by the pick-up mechanism 43 into the bale forming chamber 42, the tensioning arms 37 pivot in the direction of the arrow P to pay out the slack in the belts 29, which had been taken up in the belts 29 by the tensioning rollers 32, in order to accommodate the increasing diameter of the bale being formed. The tensioning springs 36 which act on the tensioning arms 37 ensure that the bale is formed to an appropriate degree of compactness.

The microcontroller 93 reads signals from the first rotary potentiometer 96 as the bale 2 is being formed by the baler 10, and on detecting the bale 2 having been formed to the selected diameter, the microcontroller 93 operates a circumferential wrapping system (not illustrated) to circumferentially wrap the formed bale in the bale forming chamber 42 of the baler 10. The circumferential wrapping of a bale in a bale forming chamber of a baler will be well known to those skilled in the art. On completion of circumferential wrapping of the bale, the microcontroller 93 operates the main rams 27 for pivoting the rear door 20 of the baler 10 in the direction of the arrow A from the closed state to the open state. As the rear door 20 is being pivoted from the closed to the open state and with the transfer element 16 in the first state, the formed bale is discharged onto the carrier members 70 of the transfer element 16 with the longitudinally extending central geometrical axis 48 of the bale 2 extending parallel to the transfer pivot axis 17, see FIG. 4. With the rear door 20 in the open state, the microcontroller 93 operates the first rams 75 to pivot the transfer element 16 about the transfer pivot axis 17 in the direction of the arrow D from the first state to the second state for transferring the bale 2 onto the bale wrapper 14 with the longitudinally extending main central geometrical axis 48 of the bale 2 extending parallel to the first and second bale support rollers 50 and 51, see FIGS. 5 and 6. As the transfer element 16 is being urged about the transfer pivot axis 17 by the first hydraulic rams 75 from the first state to the second state, the first bale support roller 50 is displaced in a generally downwardly direction in the direction of the arrow F, see FIG. 6, thereby maximising the headroom between the first bale support roller 50 and the carrier ring 58 during transfer of the bale 2 onto the bale wrapper 14 over the first bale support roller 50.

As the transfer element 16 is being urged by the first hydraulic rams 75 about the transfer pivot axis 17 in the direction of the arrow D from the first state to the second state, the bale 2 rolls downwardly onto the first bale support roller 50 where it is supported on the first bale support roller 50 and two of the carrier members 70 of the transfer element 16, see FIG. 5. Further pivoting of the transfer element 16 in the direction of the arrow D results in the bale being supported by both the first and the second bale support rollers 50 and 51, with the second bale support roller 51 in the appropriate one of the bale wrapping states and the first bale support roller 50 in the downwardly displaced position as illustrated in FIG. 6. Once the transfer element 16 is in the second state with the bale 2 supported on the first and second bale support rollers 50 and 51, the microcontroller 93 operates the first rams 75 to return the transfer element 16 in the direction of the arrow E from the second state to the first state for in turn returning the first bale support roller 50 upwardly to the bale wrapping state, see FIG. 7. Additionally, once the transfer element 16 has been returned to the first state, the microcontroller 93 operates the main rams 27 for pivoting the rear door 20 in the direction of the arrow B from the open state to the closed state ready for commencement of formation of the next bale to be formed.

While the transfer element 16 is transferring the bale 2 onto the bale wrapper 14, if the second bale support roller 51 has not already been set in the appropriate bale wrapping state corresponding to the diameter of the formed bale 2 by the second hydraulic rams 88, the microcontroller 93 from the look-up table determines the appropriate bale wrapping state for the second bale support roller 51 which corresponds to the selected diameter to which the bale 2 has been formed, and the microprocessor 93 then operates the second hydraulic rams 88 to pivot the carrier frame 80 about the common pivot mounting axis 86 for in turn setting the second bale support roller 51 in the appropriate bale wrapping state. With the second bale support roller 51 set in the appropriate bale wrapping state, the bale 2 is supported on the first and second bale support rollers 50 and 51 with sufficient headroom to accommodate the passage of the wrapping film dispensers 60 over the bale 2 supported on the first and second bale support rollers 50 and 51 during wrapping of the bale 2. During setting of the second bale support roller 51 in the appropriate bale wrapping state, the microcontroller 93 reads signals from the second rotary potentiometer 97 in order to determine when the angular position of the carrier frame 80 relative to the mounting plates 84 is at the angle which corresponds to the appropriate bale wrapping state.

With the bale supported on the first and second bale support rollers 50 and 51, the microcontroller 93 operates the first and second hydraulic motors 55 and 66 for rotating the first and second bale support rollers 50 and 51 and for rotating the carrier ring 58, for in turn rotating the bale 2 about the first wrapping axis 56, and for revolving the film dispensers 60 about the second wrapping axis 61. As the wrapping film dispensers 60 are being revolved about the second wrapping axis 61, the wrapping film 3 is dispensed from the wrapping film dispensers 60 and wrapped onto the rotating bale 2 with overlapping turns of the wrapping film 3.

On completion of wrapping of the bale 2 with the wrapping film 3, cut-and-hold mechanisms (not shown) are operated under the control of the microcontroller 93 to sever the wrapping film 3 which has been wrapped onto the bale 2 from the wrapping film in the wrapping film dispensers 60. The microcontroller 93 then operates the second rams 88 to pivot the carrier frame 80 in the direction of the arrow G into the discharge state for discharging the wrapped bale 2 from the bale wrapper 14, see FIG. 8.

On discharge of the wrapped bale 2 from the bale wrapper 14, the microprocessor 93 operates the second rams 88 to return the mounting element 80 and in turn the second bale support roller 51 to the appropriate one of the bale wrapping states, so that the bale wrapper 14 is ready to receive and wrap the next bale from the baler 10.

While the bale wrapper according to the invention with the transfer element has been described as being mounted on a combined baler/bale wrapper, it is envisaged that the bale wrapper according to the invention with the transfer element may be provided as a bale wrapper in its own right without being mounted on a combined baler/bale wrapper or attached to a baler. In which case, the bale wrapper may be adapted so that the transfer element would be configured to pick up a bale from the ground and transfer the bale onto the bale wrapper, or alternatively, the transfer element may be adapted for receiving a bale placed thereon by another device, for example, a bale handler, or being dropped from a baler independently of the bale wrapper for transfer of the bale onto the bale wrapper.

It is also envisaged that the bale wrapper according to the invention, whether provided on its own or in conjunction with a baler in the form of a combined baler/bale wrapper, may be provided with the transfer element, but with the second bale support roller being adapted to operate in one bale wrapping state only. It is envisaged in the case of this bale wrapper according to the invention that while the second bale support roller is only operable in one single bale wrapping state, the second bale support roller would be mounted on a mounting element, carrier frame or other suitable mounting arrangement which would permit lowering of the second bale support roller in order to facilitate discharge of a bale from the bale wrapper. In cases where the bale wrapper according to the invention is provided in conjunction with a baler in the form of a combined baler/bale wrapper, and where the second bale support roller is operable in only one single bale wrapping state, it is envisaged that the baler may be configured to produce bales of one diameter only, or the baler may be configured to permit bales of selectable diameters to be formed, whereby the diameters of the bales would be such as to be accommodated by the available headroom of the bale wrapper during wrapping of the bale.

Further, it is envisaged that the bale wrapper according to the invention with the second bale support roller operable in the plurality of second bale wrapping state, whether provided on its own or in conjunction with a baler in the form of a combined baler/bale wrapper, may be provided without the transfer element. In which case, where this bale wrapper according to the invention is provided in conjunction with a baler in the form of a combined baler/bale wrapper, any other suitable transfer means for transferring the bale from the baler to the bale wrapper may be provided, and in certain cases, it is envisaged that the baler and this bale wrapper according to the invention may be located relative to each other so that the bale is discharged from the baler directly onto the bale wrapper.

While the bale wrapper has been described as comprising a pair of wrapping film dispensers mounted on a carrier ring, in certain cases, it is envisaged that a single wrapping film dispenser may be provided, and indeed in other cases more than two wrapping film dispensers may be provided. It is also envisaged that instead of the wrapping film dispensers being rigidly secured to the carrier ring, it is envisaged that the wrapping film dispenser or dispensers may be mounted on the carrier ring such that the carrier ring would be fixed but would guide the wrapping film dispenser or dispensers around the second wrapping axis. In which case, a suitable transmission means would be provided for driving the wrapping film dispenser or dispensers around the carrier ring.

It will also be appreciated that the second wrapping axis instead of being horizontal may extend at an angle to the horizontal, in which case the carrier ring or other such carrier element or carrier means which either carry or guide the wrapping film dispenser or dispensers around the second wrapping axis would define a carrier plane which would extend at a corresponding angle to a vertical plane.

While the carrier means has been described as comprising a carrier ring of circular shape, the carrier ring may be of any other suitable or desired shape.

It is also envisaged that the baler may be of any other suitable or desirable construction besides being a belt baler. For example, it is envisaged that the baler may be of the type which is commonly referred to as a fixed chamber baler whereby the bale forming chamber is defined by a plurality of parallel bale rotating rollers which define the circumferential periphery of the bale forming chamber.

While the transfer means has been described as comprising a transfer element of a particular shape and construction, any other suitable transfer means may be provided. It will also be appreciated that any other suitable receiving means besides the carrier members may be provided on the transfer element for receiving a formed bale for transfer to the bale wrapper. Where the receiving means is provided by carrier members, it is envisaged that the carrier members may comprise rotatable carrier rollers.

While the means for setting the second bale support roller in the selectable bale wrapping states has been described as comprising the combination of the pivotally mounted carrier frame and the second hydraulic rams for pivoting the carrier frame about the pivot mounting axis, for in turn raising and lowering the second bale support roller relative to the first bale support roller when the first bale support roller is in the bale wrapping state, it is envisaged in certain cases that the second bale support roller may be urged laterally with rectilinear motion towards and away from the first bale support roller into the respective selectable bale wrapping states. In which case, the spacing between the first and second bale support rollers would be altered for setting the second bale support roller in the respective selectable bale wrapping states. This would also permit the level at which the bale is supported on the first and second bale support rollers to be varied, in order to vary the headroom available to the bale during wrapping thereof. Where the second bale support roller is laterally moveable relative to the first bale support roller with rectilinear motion, it is envisaged that the second bale support roller may be mounted on a telescoping element which would facilitate urging of the second bale support roller towards and away from the first bale support roller for selecting the respective ones of the selectable bale wrapping states of the second bale support rollers.

Indeed, it is envisaged that the second bale support roller could be supported on a carrier frame which would comprise a pair of side members, which would be pivotally mounted as already described, and the side members could also be telescoping members or slideably mounted relative to each other. The pivotal movement could be used for operating the second bale support roller between the bale wrapping state and the discharge state, while the slideable movement of the side members could be used for adjusting the spacing between the first and second bale support rollers.

It is also envisaged that the second bale support roller may only be urged into the bale wrapping state when the bale has been transferred by the transfer element onto the first and second bale support rollers. However, the second bale support roller would be maintained in the appropriate bale wrapping state during wrapping of the bale on the bale wrapper.

It is also envisaged that the second bale support roller may be operated under certain circumstances to assist in retaining a bale on the bale wrapper during towing of the combined baler/bale wrapper by the tractor or other towing vehicle. For example, in a case, when the combined baler/bale wrapper is being towed up a hill or an upward incline, the second bale support roller would be urged upwardly to the maximum level above the level of the first bale support roller, in other words, to the maximum level at which the second bale support roller could be set above the horizontal plane containing the first rotational axis of the first bale support roller when the combined baler/bale wrapper is on horizontal ground. This would act to prevent the bale rolling backwardly off the bale wrapper as the combined baler/bale wrapper is being towed up a hill or an upward incline. On the other hand, in cases where the combined baler/bale wrapper is being towed downwardly down a hill or other such downward incline, it is envisaged that the second bale support roller would be located at the lowest level at which the second bale support roller could be supported below the level of the horizontal plane containing the first rotational axis of the first bale support roller when the combined baler/bale wrapper is on level ground. In which case, it is envisaged that the combined baler/bale wrapper may be provided with a tilt switch for detecting the angle of the combined baler/bale wrapper relative to the horizontal, and the second ram would be operable in response to signals from the tilt switch indicating that the combined baler/bale wrapper is being towed upwardly up an upward incline or downwardly down a downward incline for appropriately raising or lowering the second bale support roller.

While the microcontroller has been described as continuously monitoring signals from the second rotary potentiometer during wrapping of the bale in the bale wrapper and for controlling the operation of the second rams for maintaining the second bale support roller in the desired bale wrapping state, it is envisaged that once the second rams have been operated to initially set the second bale support roller in the appropriate bale wrapping state in response to signals read from the second rotary potentiometer, no further reading of the signals from the second rotary potentiometer should be needed during wrapping of the bale, since once the second rams have been set with the second bale support roller in the appropriate bale wrapping state, it is believed that the second rams should be capable of maintaining the second bale support roller in the appropriate bale wrapping state during wrapping of that bale without further monitoring the level of the second bale support roller.

While the control means has been described as comprising a control circuit comprising a signal processor provided by a microcontroller, any other suitable control circuit, and any other suitable signal processor may be provided. For example, control of the operation of the combined baler/bale wrapper could be carried out by a signal processor provided by a microprocessor, and indeed, in certain cases the signal processor may be provided by a programmable logic controller.

While the baler and the bale wrapper of the combined baler/bale wrapper have been described for forming a bale of forage material and wrapping the bale, both the baler and the bale wrapper could be adapted for forming and wrapping bales of any type of material, be it forage material such as grass, hay, straw, silage and the like, or any other material, be it agricultural waste material or indeed industrial waste material or any other material.

Further, it is envisaged that the bale wrapper may be adapted for wrapping bales of cotton and other such materials.

While the first and second urging means have been described as being provided by pairs of first and second hydraulic rams, it is envisaged in certain cases that single first and second hydraulic rams may be provided. Indeed, it will also be appreciated that any other suitable first and second urging means besides rams may be provided. For example, linear motors, be they hydraulic linear motors or electrical linear motors, solenoids or the like may be provided.

While the carrier plane defined by the carrier ring has been described as extending substantially vertically and transversely of the combined baler/bale wrapper, it will be appreciated that it is not necessary that the carrier plane defined by the carrier ring should extend vertically. The carrier plane defined by the carrier ring may extend at any suitable or desirable angle to the vertical plane. Indeed, in certain cases, it is envisaged that the carrier plane defined by the carrier ring may extend at an angle of up to plus or minus 30° to the vertical plane, plus 30° being indicative of an upwardly forward inclination of the carrier frame at 30° relative to the vertical plane, and minus 30° being indicative of an upwardly rearwardly inclination of the carrier plane at 30° relative to the vertical plane Indeed, in other cases, it is envisaged that the carrier ring may extend relative to the horizontal at an angle of up to 30° to the horizontal. In which case, the advantage of the bale wrapper according to the invention whereby the second bale support roller is operable in a plurality of selectable bale wrapping states would allow bales of different diameters to be supported on the first and second bale support rollers with the level of the longitudinally extending central geometrical axis of the bales maintained at a substantially constant level, or within a relatively narrow range of levels irrespective of the diameter of the bale. This would allow the wrapping film to be applied to the rotating bale with a longitudinally extending centre line of the wrapping film substantially coinciding with the longitudinally extending central geometrical axis of the bale irrespective of the diameter of the bale within reason, which is desirable during wrapping of a cylindrical bale.

It will also be appreciated that while the open mouth defined by the stationary part of the baler has been described as defining a plane which extends in a generally upwardly forwardly direction relative to the normal forward direction of travel of the combined baler/bale wrapper, the open mouth defined by the stationary part of the baler may be inclined in a generally upwardly rearwardly direction relative to the normal forward direction of travel of the combined baler/bale wrapper.

While the moveable one of the first and second bale support rollers which is moveable into a plurality of selectable bale wrapping states has been described as being the second bale support roller, in certain cases, it is envisaged that the moveable one of the first and second bale support rollers which would be moveable into the selectable bale wrapping states could be the first bale support roller. In which case, it is envisaged that the first bale support roller would be mounted on the transfer element where the bale wrapper is provided with a transfer element, and the first bale support roller would be mounted on the transfer element to be moveable relative to the transfer element for in turn moving the first bale support roller relative to the second bale support roller into selectable ones of the plurality of selectable bale wrapping states.

While the bale wrapper has been described as being a two axis bale wrapper whereby the wrapping film dispensers are revolved around the rotating bale about a second wrapping axis, which extends substantially horizontally, it is envisaged that the bale wrapper may be of the type in which one or more wrapping film dispensers are rotated about a vertically extending second wrapping axis while the bale is being rotated about the first wrapping axis coinciding with the longitudinally extending central geometrical axis of the bale which would extend horizontally.

While the bale wrapper has been described for wrapping a cylindrical bale, it is envisaged that the bale wrapper may be adapted for wrapping a parallelepiped bale, and in which case when provided in a combined baler/bale wrapper, the baler would be a baler of the type for producing a parallelepiped bale.

The invention claimed is:

1. A combined baler/bale wrapper comprising:
a chassis
a baler mounted on the chassis, and
a bale wrapper mounted on the chassis,
the bale wrapper comprising:
rotatably mounted parallel spaced apart first and second bale support rollers operable in a bale wrapping state for supporting the bale and for rotating the bale about a first wrapping axis during wrapping of the bale,
a transfer means pivotal about a transfer pivot axis from a first state for receiving a bale thereon to a second state for transferring the bale onto the bale wrapper, and
a receiving means located on the transfer means for receiving a bale from the baler to be transferred onto the bale wrapper,
wherein
the first bale support roller is mounted on the transfer means and is moveable with the transfer means relative to and independently of the second bale support roller,
the receiving means and the first bale support roller are located on respective opposite sides of the transfer pivot axis, so that as the transfer means is pivoted about the transfer pivot axis from the first state to the second state the receiving means is urged in an upwardly direction and the first bale support roller is urged in a downwardly direction from the bale wrapping state for minimising the headroom required by the bale as the bale is being transferred by the transfer means from the receiving means to the bale wrapper, and
the transfer means is located between the baler and the bale wrapper so that a formed bale is discharged from the baler onto the receiving means when the transfer means is in the first state.

2. A combined baler/bale wrapper as claimed in claim 1 in which the first bale support roller is rotatably mounted on the transfer means about a first rotational axis parallel to and spaced apart from the transfer pivot axis, and the second bale support roller is rotatable about a second rotational axis extending parallel to and spaced apart from the first rotational axis defined by the first bale support roller, the second rotational axis defined by the second bale support roller and the transfer pivot axis being located on respective opposite sides of the first rotational axis defined by the first bale support roller.

3. A combined baler/bale wrapper as claimed in claim 2 in which the first bale support roller is configured on the transfer means so that when the transfer means is in the second state, the first bale support roller is in a maximum downwardly displaced state at its maximum spacing below a horizontal plane containing the second rotational axis defined by the second bale support roller.

4. A combined baler/bale wrapper as claimed in claim 1 in which a carrier means is provided for carrying and guiding at least one wrapping material dispenser along a locus of travel about a second wrapping axis for dispensing wrapping material onto the bale as the bale is being rotated on the first and second bale support rollers about the first wrapping axis, the second wrapping axis extending relative to the first wrapping axis at an angle greater than zero.

5. A combined baler/bale wrapper as claimed in claim 4 in which the carrier means defines a carrier plane containing the locus of travel through which the at least one wrapping material dispenser is guided by the carrier means about the second wrapping axis, the second wrapping axis extending substantially perpendicularly to the carrier plane, the carrier plane extending in one of an upwardly direction extending parallel with or coinciding with a vertical plane containing the first wrapping axis, an upwardly inclined direction inclining upwardly relative to the vertical plane containing the first wrapping axis in a direction towards the first bale support roller, and an upwardly inclined direction inclining upwardly relative to the vertical plane containing the first wrapping axis in a direction towards the second bale support roller.

6. A combined baler/bale wrapper as claimed in claim 4 in which the carrier means comprises a carrier ring rotatably mounted on the chassis about the second wrapping axis for revolving the at least one wrapping material dispenser about the second wrapping axis.

7. A combined baler/bale wrapper as claimed in claim 1 in which one of the first bale support roller and the second bale support roller is moveable relative to the other one of the first bale support roller and the second bale support roller into selectable ones of a plurality of bale wrapping states co-operating with the other one of the first and second bale support rollers for supporting bales thereon of different diameters for minimising the headroom required by a bale supported on the first and second bale support rollers, and a second urging means is provided for urging the moveable one of the first and second bale support rollers between the selectable ones of the plurality of bale wrapping states.

8. A combined baler/bale wrapper as claimed in claim 7 in which a control means is provided for controlling the operation of the baler and the bale wrapper, and an input means is provided communicating with the control means for facilitating inputting to the control means of an input signal indicative of a selected diameter to which the bale is to be formed by the baler, the control means being responsive to the input signal indicative of the selected diameter to which the bale is to be formed for controlling the second urging means of the bale wrapper to urge the moveable one of the first and second bale support rollers relative to the other one of the first and second bale support rollers, to the one of the selectable one of the bale wrapping states corresponding to the selected diameter to which the bale is to be formed.

9. A combined baler/bale wrapper as claimed in claim 1 in which the baler is adapted to produce a cylindrical bale defining a longitudinally extending central geometrical axis, and the baler is located on the chassis to discharge the bale with the longitudinally extending central geometrical axis of the bale extending substantially parallel to the first and second bale support rollers of the bale wrapper.

10. A combined baler/bale wrapper as claimed in claim 1 in which the baler comprises a stationary part mounted on the chassis, the stationary part defining an open mouth through which a formed bale is discharged from the baler, and a door pivotally coupled to the stationary part about a door pivot axis between a closed state closing the open mouth and an open state for accommodating discharge of a bale from the baler.

11. A combined baler/bale wrapper as claimed in claim 10 in which the door is located to the rear of the stationary part of the baler relative to the normal forward direction of travel of the combined baler/bale wrapper, and the open mouth of the baler faces in a generally rearward direction relative to the normal forward direction of travel of the combined baler/bale wrapper.

12. A combined baler/bale wrapper as claimed in claim 10 in which the open mouth of the baler defines a plane which extends transversely relative to the normal forward direction of travel of the combined baler/bale wrapper, and in one of an upwardly direction, an upwardly inclined direction inclining upwardly relative to a transversely extending vertical plane in a forward direction relative to the normal forward direction of travel of the combined baler/bale wrapper, and an upwardly inclined direction inclining upwardly relative to the transversely extending vertical plane in a rearward direction relative to the normal direction of forward travel of the combined baler/bale wrapper.

13. A combined baler/bale wrapper as claimed in claim 12 in which the plane defined by the open mouth extends in the upwardly inclined direction towards the one of the forward and rearward directions at an angle not greater than 30° to the transversely extending vertical plane.

14. A combined baler/bale wrapper as claimed in claim 10 in which the baler is mounted on the chassis so that when the door of the baler is urged from the closed state to the open state, a formed bale is discharged from the baler onto the transfer means of the bale wrapper.

15. A combined baler/bale wrapper as claimed in claim 1 in which the bale wrapper is located rearwardly of the baler relative to the normal forward direction of travel of the combined baler/bale wrapper.

16. A combined baler/bale wrapper as claimed in claim 1 in which a first urging means is provided for urging the transfer means between the first and second states.

17. A combined baler/bale wrapper as claimed in claim 1 in which the baler comprises a belt baler.

\* \* \* \* \*